(12) United States Patent
Kindler et al.

(10) Patent No.: US 9,195,777 B2
(45) Date of Patent: Nov. 24, 2015

(54) SYSTEM, METHOD AND COMPUTER PROGRAM PRODUCT FOR NORMALIZING DATA OBTAINED FROM A PLURALITY OF SOCIAL NETWORKS

(71) Applicant: Cleanport, BV, BM Doetinchem (NL)

(72) Inventors: Noah Kindler, Atherton, CA (US); Gregory Dean, San Francisco, CA (US); Saman Sedighian, San Jose, CA (US); Valeri Savvateev, Palo Alto, CA (US); Michael Bennett, San Diego, CA (US)

(73) Assignee: Avira B.V., BM Doetinchem (NL)

( * ) Notice: Subject to any disclaimer, the term of this patent is extended or adjusted under 35 U.S.C. 154(b) by 154 days.

(21) Appl. No.: 13/773,548

(22) Filed: Feb. 21, 2013

(65) Prior Publication Data

US 2013/0238600 A1    Sep. 12, 2013

Related U.S. Application Data

(60) Provisional application No. 61/608,002, filed on Mar. 7, 2012.

(51) Int. Cl.
| | |
|---|---|
| *G06F 7/00* | (2006.01) |
| *G06F 17/30* | (2006.01) |
| *G06F 21/50* | (2013.01) |
| *G06F 21/55* | (2013.01) |
| *G06Q 50/00* | (2012.01) |
| *H04L 29/08* | (2006.01) |

(52) U.S. Cl.
CPC .......... *G06F 17/30958* (2013.01); *G06F 21/50* (2013.01); *G06F 21/552* (2013.01); *G06Q 50/01* (2013.01); *G06F 2221/2149* (2013.01); *H04L 67/306* (2013.01)

(58) Field of Classification Search
None
See application file for complete search history.

(56) References Cited

U.S. PATENT DOCUMENTS

| 7,346,541 | B1 | 3/2008 | Cuttler et al. |
| 8,224,727 | B2 | 7/2012 | Hirson et al. |
| 8,478,708 | B1 | 7/2013 | Larcom |
| 8,725,672 | B2 * | 5/2014 | Rostampour et al. ........... 706/45 |
| 2008/0281726 | A1 | 11/2008 | Gupta |
| 2008/0306839 | A1 | 12/2008 | Starrs |
| 2009/0171904 | A1 * | 7/2009 | O'Sullivan et al. ............... 707/3 |
| 2011/0047508 | A1 | 2/2011 | Metzler et al. |
| 2012/0047147 | A1 * | 2/2012 | Redstone et al. ............. 707/748 |

(Continued)

OTHER PUBLICATIONS

Nair et. al. "Method and System for generating a social graph between users in a network using Social graphs of the users from External Social Networks". Apr. 29, 2010 IP.com. pp. 1-3.*

*Primary Examiner* — Robert Beausoliel, Jr.
*Assistant Examiner* — Michael Pham
(74) *Attorney, Agent, or Firm* — Cooley LLP

(57) ABSTRACT

Various embodiments of a system, method and computer program product for normalizing data obtained from a plurality of social networks coupled to a network such as the Internet are disclosed. The system may include an interface adapted to access information from a plurality of social networks. The information that is obtained from each social network may include personal information about with the user as well as social graphs of the user that map the user to his or her friends. A data analyzer may be provided to compare the personal information obtained from the plurality of social networks to determine a normalized set of personal information for the user. The data analyzer may also compare the social graphs to determine a normalized set of friends associated with the user.

10 Claims, 15 Drawing Sheets

(56) References Cited

U.S. PATENT DOCUMENTS

| | | |
|---|---|---|
| 2012/0047184 A1 | 2/2012 | Purdy |
| 2012/0096002 A1* | 4/2012 | Sheehan et al. ............... 707/737 |
| 2012/0159647 A1* | 6/2012 | Sanin et al. ..................... 726/28 |
| 2012/0238242 A1 | 9/2012 | Hirson et al. |
| 2012/0310926 A1 | 12/2012 | Gannu et al. |
| 2013/0006880 A1* | 1/2013 | Dey et al. ...................... 705/319 |
| 2013/0060744 A1* | 3/2013 | Roychoudhuri et al. ...... 707/706 |
| 2013/0097237 A1* | 4/2013 | Kothari et al. ................. 709/204 |
| 2013/0110812 A1 | 5/2013 | Lakshmanan et al. |

\* cited by examiner

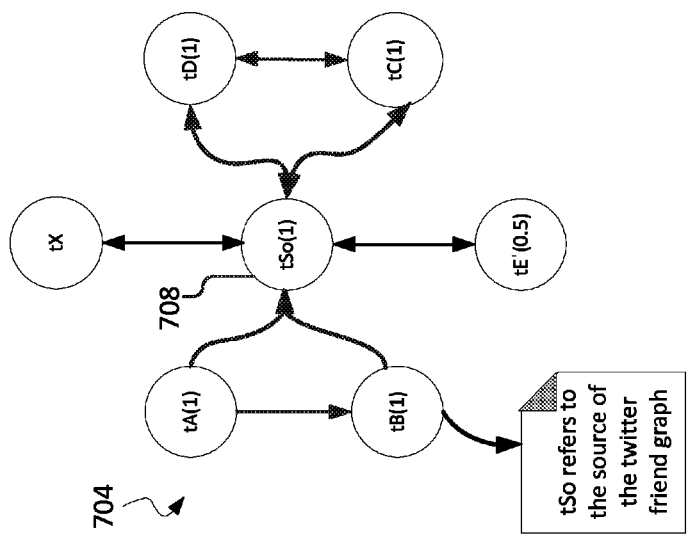
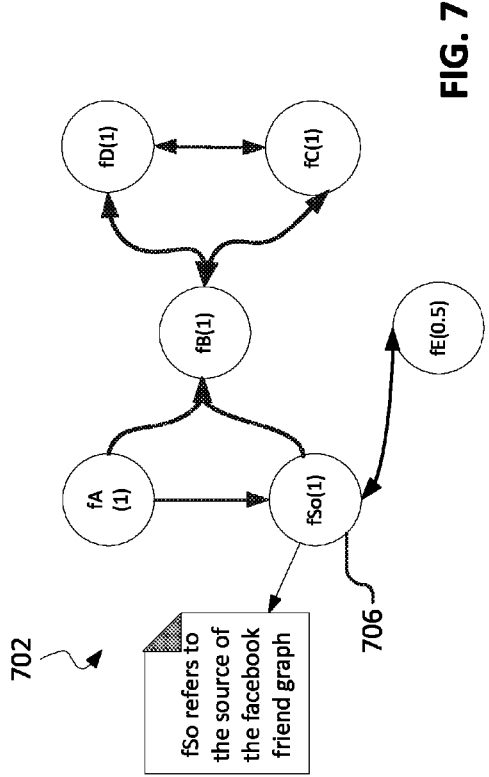
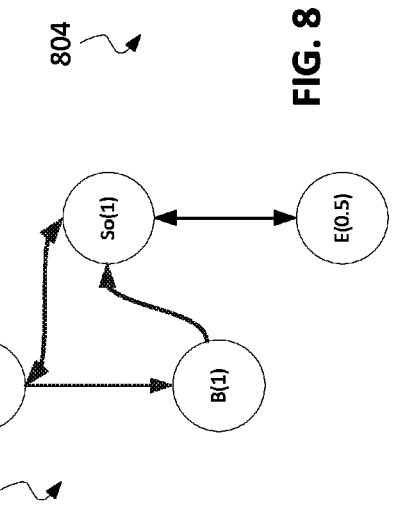
FIG. 7
FIG. 8

SYSTEM, METHOD AND COMPUTER PROGRAM PRODUCT FOR NORMALIZING DATA OBTAINED FROM A PLURALITY OF SOCIAL NETWORKS

CROSS REFERENCE TO RELATED APPLICATIONS

This application claims the benefit of U.S. Provisional Application No. 61/608,002, filed Mar. 7, 2012, which is hereby incorporated by reference herein in its entirety.

TECHNICAL FIELD

Embodiments of the present invention generally relate to analyzing data obtained from a network and, in particular, analyzing information obtained from one or more social networks.

BACKGROUND

Generally speaking, a social network is a social structure made up of a set of actors (such as individuals or organizations) and the dyadic ties between these actors. (See http://en.wikipedia.org/wiki/Social_network). In the context of the Internet and other networks, a social network may be viewed as a set of social relations that link people through a network. Exemplary social networks include, for example, the Facebook social network, Twitter, Google+ (also known as Google Circles), LinkedIn, as well as various information or photo sharing sites such as Flickr and Pinterest.

Analyzing and presenting data obtained across more than one of these social network may be difficult. Each social network may use its own proprietary format for the data they expose through their respective interfaces. A consumer of this data whose goal is to gain a holistic view of one or more user's data across multiple social networks must manually compare the data elements obtained from each social network. This process is cumbersome to say the least. As a result, there is a need to normalize data obtained from a plurality of social networks so analysis and presentation across multiple social networks may be made easier.

In addition, there is class of software known as internet safety software that includes parental control and reputation protection that typically gather information about a user's online activity—including activity on social networks. These types of safety software, however, do not have a way to assess aggregate risk to a user based on an analysis of data associated with the user from the Internet and/or one or more social networks. Aggregating risk could allow easier comprehension of risk to an online user.

SUMMARY

In accordance with the disclosures herein, various embodiments of a system, method and computer program product for normalizing data obtained from a plurality of social networks coupled to a network such as the Internet are described. Such a system may include an interface that is adapted to access a plurality of social networks via a network. The system may also have one or more social network adapters that are adapted to obtain information associated with a user's account from each of the social networks. The information that is obtained from each social network may include personal information about with the user as well as social graphs of the user that map the user to his or her friends (and other entities). A data analyzer may be provided to compare the personal information obtained from the plurality of social networks to determine a normalized set of personal information for the user. The data analyzer may also be adapted to compare the social graphs to determine a normalized set of friends associated with the user. A data store is also provided to store the normalized set of personal information and friends associated with the user.

Accessing the plurality of social networks may be performed using a plurality of interfaces with each interface associated with a corresponding social network of the plurality of social networks. In some embodiments, a social graph may comprise a plurality of nodes including a node for the user as well as a plurality of nodes for friends of the user. When comparing the social graphs, the system may determine a degree of matching between similar friend nodes of the plurality of social graphs and then identify a set of maximum common subgraphs shared between the plurality of social graphs. For each pair of shared friend nodes in the set of maximum common subgraphs, the system may then add a friend to a set of normalized friends that are associated with the user. In addition, a friend may also be added for the set of normalized friends for each node found in the social graphs that is found to be unshared with any of the other social graphs.

Embodiments of the comparison may be conducted via the calculation of Levenshtein distance between similar items information between the social networks—including personal information and social graph nodes.

In addition, various embodiments of a system, method and computer program product for assessing an aggregate risk score for a user of a social network's online activities are also disclosed. The system may include an interface that is adapted to obtain information about online activities concerning (or relating to) a subject via a network such as the Internet. An analyzing component may be provide that is adapted to analyze the collected information in order to find one or more potential dangers to the subject (these potential dangers may be referred to as "warnings"). The analyzing component may then associate a severity level to each identified potential danger and then assigning a weight to each identified potential danger based on its associated severity level and the current age of the identified potential danger (e.g., the difference in time from between the date the potential danger was posted to the Internet and the current date or date that the danger was identified by the social network analyzer). Next, the analyzer may aggregate the weighted identified potential dangers in order to obtain an aggregate online risk score for the subject.

In one embodiment, a notification containing the aggregate risk score may be sent from the system to the subject (and/or other authorized party) via the network. As additional option, the system may afford the subject and/or other authorized party access to the aggregate risk score and may even display the aggregate risk score to the subject (and/or authorized party) via the network.

Embodiments of the system may also be implemented so that information is obtained from one or more social networks coupled to the network. In these embodiment, it may be especially useful to normalize the information obtained from the social networks in order to present a unified set of data for analysis in determining the aggregate risk score.

Potential dangers may include warnings associated with strangers which may be identified by determining whether the author of the information (such as, e.g., a person making an online statement comprising the warning) is a friend within a social network/social graph of the subject. Potential dangers may also include warnings associated with weak friends to the subject. The analysis to identify weak friend warnings may comprise identifying a number of friends in a social network held in common between the subject and an author of the obtained information, and then determining whether the identified number equals and/or exceeds a predetermined threshold number of friends. Potential dangers may also include postings or messages containing words and phrases on a blacklist of suspect or high-risk words including, for example, phone numbers of the subject, drugs-related references, and profanity-related references for example.

DESCRIPTION OF THE DRAWINGS

FIG. 7 illustrates an exemplary weighting technique mapping technique to normalize data from plurality of social graphs.

FIG. 8 illustrates the two maximum common subgraphs of the exemplary subgraphs shown in FIG. 7.

DETAILED DESCRIPTION

Figure 1:
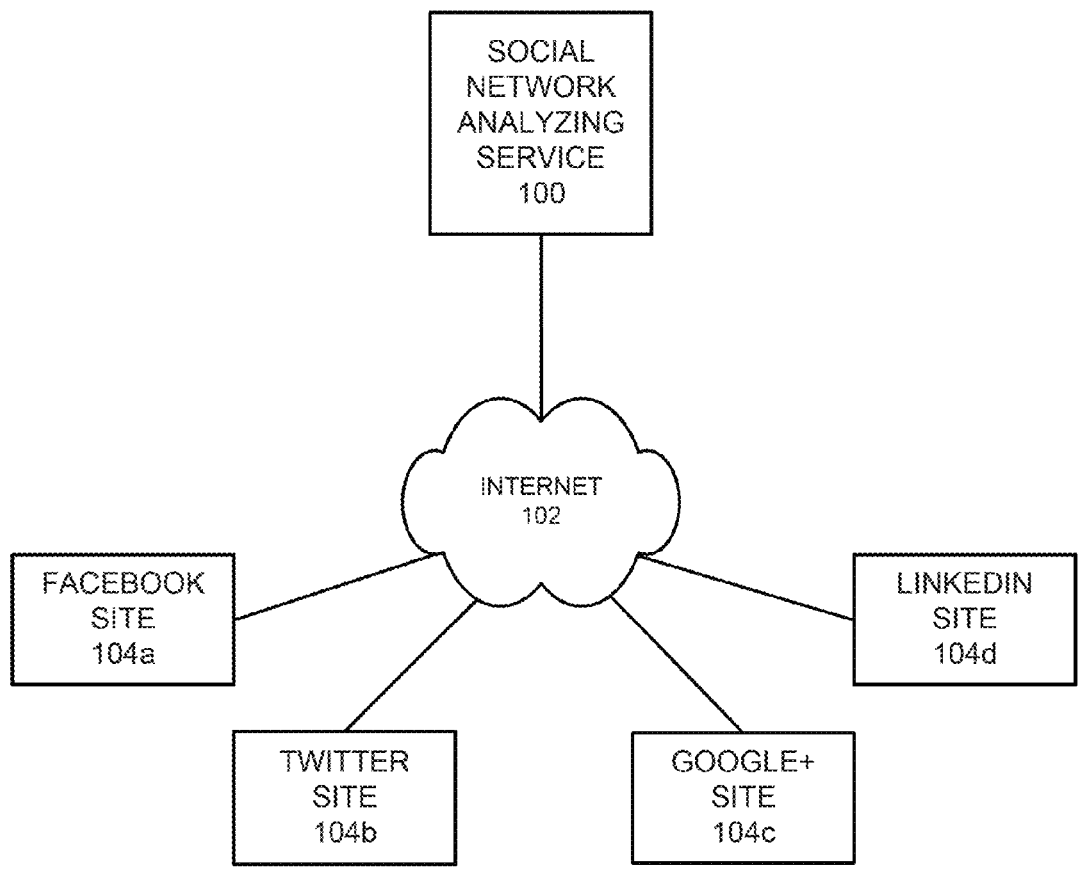
FIG. 1 is a block diagram of an exemplary network-based environment for implementing various embodiments described herein.

FIG. 1 is a block diagram of an exemplary network-based environment for implementing various embodiments of a social network analyzing service 100 ("social network analyzer"). As shown in FIG. 1, a social network analyzer 100 may be coupled to a network such as the Internet 102 in order to access a wide variety of social networks 104a, 104b, 104c, 104d, 104e that are also coupled to the network 102. These social networks may include, for example, Facebook 104a, Twitter 104b, Google+ (also known as Google Circles) 104c, LinkedIn 104d, as well as various information or photo sharing sites such as Flickr and Pinterest.

Figure 2:
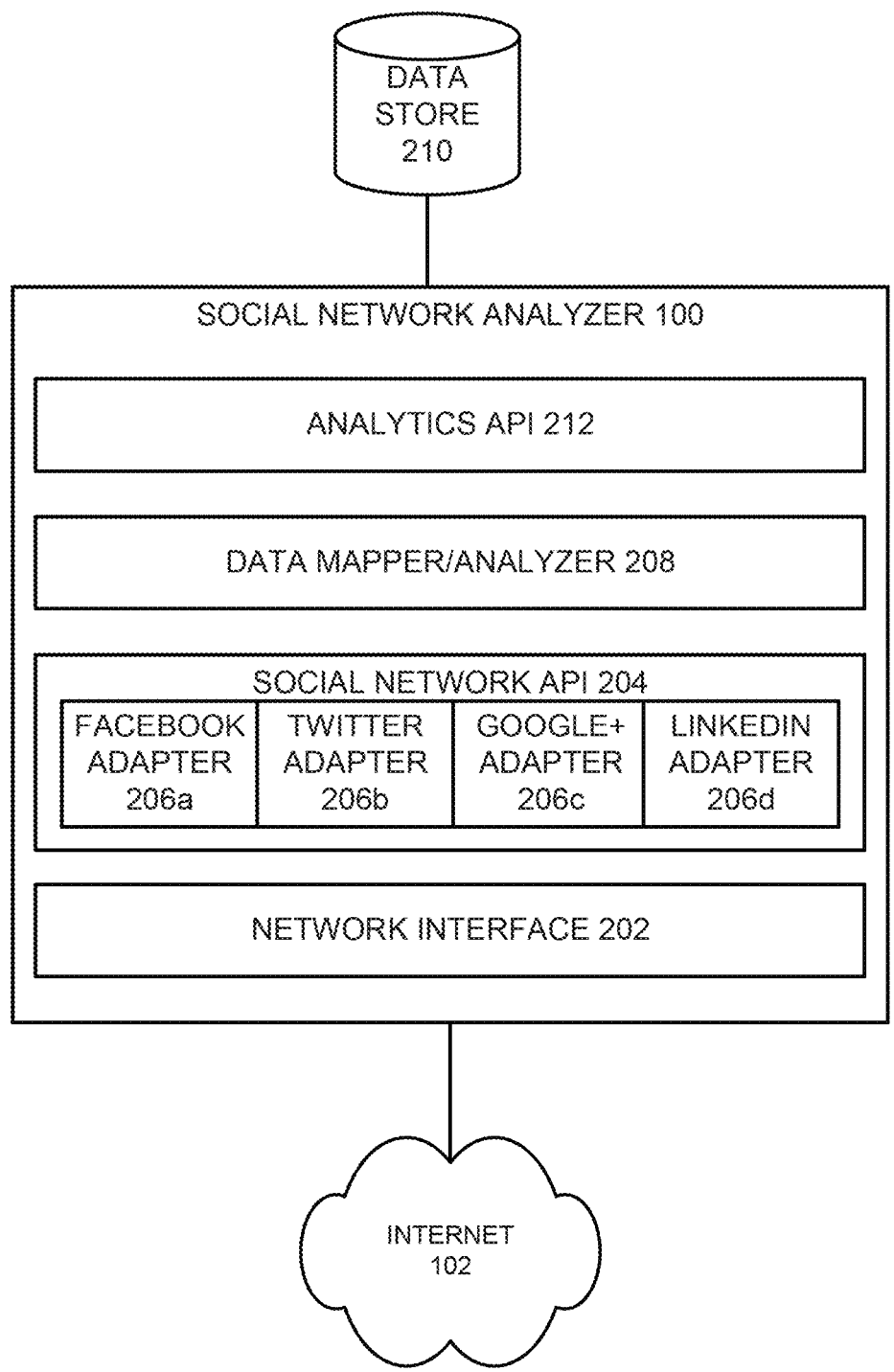
FIG. 2 is a block diagram of an exemplary social network analyzing service that may be implemented to normalize data collected from a plurality of social networks.

With reference to FIG. 2, in order to normalize data collected from a plurality of social networks, a social network analyzer 100 may include a network interface 202 adapted for interfacing with one or more networks including the Internet, for example, in order to allow the social network analyzer 100 to communicate over the network(s) with other sites or nodes connected to the network. In one embodiment, the network interface may be adapted for communicating using TCP/IP as well as HTTP and HTTPS protocols.

The social network analyzer 100 may also be provided with a social network application protocol interface 204 ("social network API") for communicating with various social networks 104a, 104b, 104c, 104d. As shown in FIG. 2, the social network API 204 may include a plurality of social network adapters 206a, 206b, 206c, 206d. Each social network adapter 206a, 206b, 206c, 206d is adapted for communicating with an associated social network so that each social network adapter may retrieve information from its associated social network—including information and data about individual users of the social network. For example, the social network API 204 may include a Facebook adapter 206a that is adapted for communicating with the Facebook social network 104a in order to access and retrieve information from Facebook about users of the Facebook social network. Similarly, a Twitter adapter 206b may be provided that is adapted for communicating with the Twitter social network 104b in order to access and retrieve information from Twitter about users of the Twitter social network, and so on. In one embodiment, the social network adapters 206a, 206b, 206c, 206d may be implemented as plug-ins (or similar add-on functionalities) so that social network adapters can be selectively added and removed from the social network API 204 as needed. This way, the social network API 204 may be customized to access various combinations of social networking sites and given the ability add new adapters when new social networks are introduced in the future.

The social network analyzer 100 may also include a data analyzing component 208 ("data analyzer") that is adapted to perform various analyses on the data collected by the social network API 204 and social network adapters 206 206a, 206b, 206c, 206d from the various social networking sites. For example, the data analyzer 208 may be implemented (either alone or in conjunction with the social network adapters) in order to perform various procedures in order to normalize and map the collected data as set forth herein.

The social network analyzer 100 may be provided with or coupled to a data storage device 210 (the "normalized database") in which data may be stored and retrieved by the social network analyzer 100. Data stored in the data storage device 210 may include the raw data retrieved from the social network sites, data normalized and/or mapped by social network analyzer, as well as data created during analysis and presentment post-normalization. The social network analyzer 100 may also include an analytics API 212 that allows other applications and users to access, retrieve and store data in the storage device 210. Thus, via the analytics API 212, outside applications and third party users may obtain access to the data stored in the storage device for analysis and presentation. In one embodiment, the analytics API X0X512 may be accessible to users and other third parties via the network 102.

Figure 3:
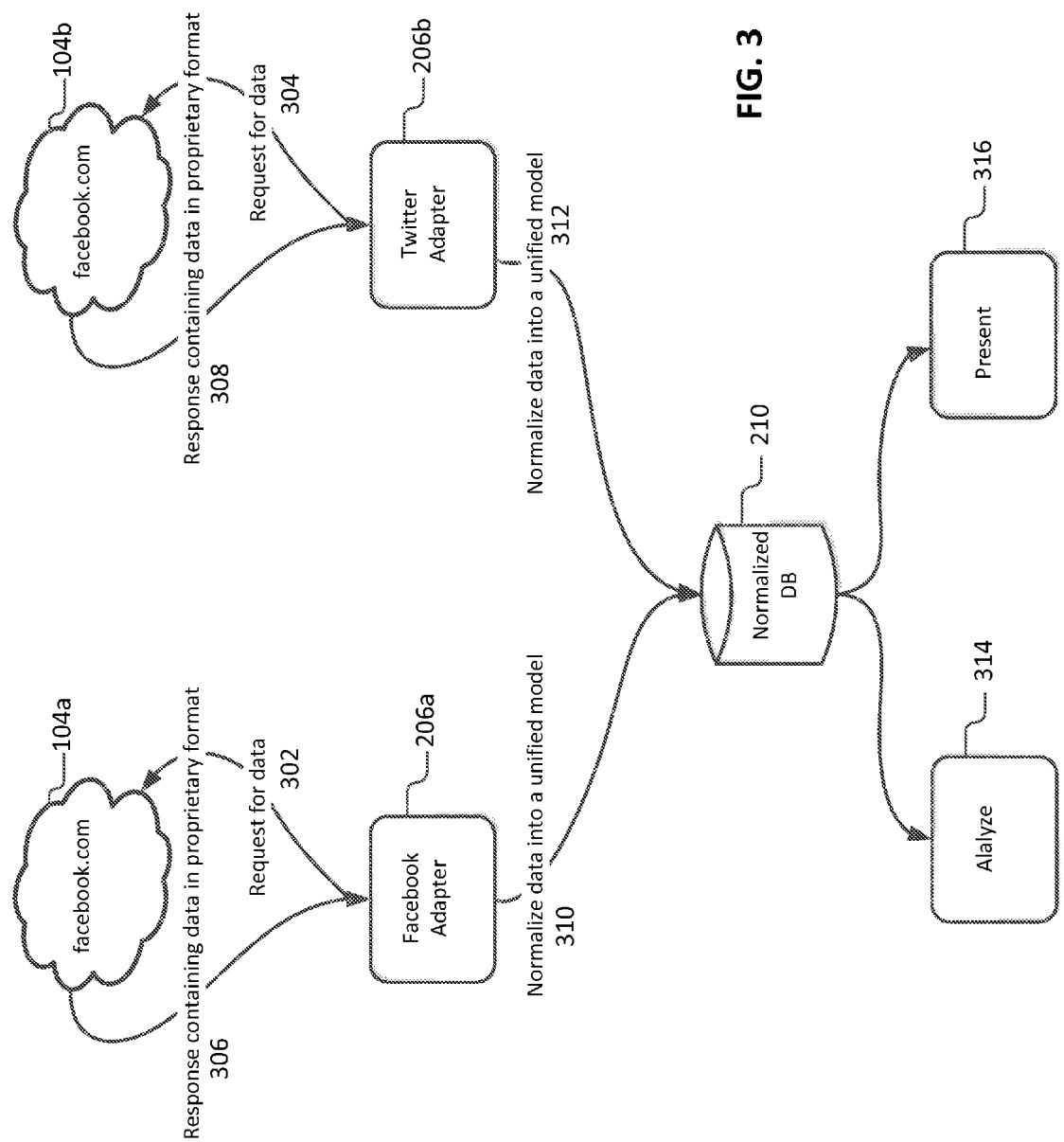
FIG. 3 is a process flow diagram for normalizing data collected from a plurality of social networks in accordance with an illustrative embodiment.

FIG. 3 depicts an illustrative process for collecting and normalizing data from a plurality of social networks using a social network analyzer 100. In this example, data is collected from two social networks: Facebook 104a (www.facebook.com) and Twitter 104b (www.twitter.com). Via a network (such as, e.g., the Internet 102), the social network analyzer 100 requests data (via request for data paths 302, 304) from the two social networks 104a, 104b about user or subscriber to each of the social networks (i.e., someone or entity that maintains an account with each social networks). As shown in FIG. 3, the requests can be made, for example, by the respective social network adapters 206a, 206b associated with the selected social networks 104a 104b. For example, the social network adapter 206a for Facebook may issue a request for data to Facebook 104a about a person who has a user account with Facebook while the social network adapter 206b for Twitter may issue a request for data to Twitter 104b about a Twitter account held by that same person. As another option, the respective social network adapters may simply request data about user accounts from a list or set of users maintained by or provided to social network analyzer 100. In any event, the requests for data may be made by the social network adapters 206a, 206b using the protocols and/or APIs made available typically by the various social networks in order to allow third parties to access data about users/subscribers of the given social network. In response to the request from the respective social network adapters of the social network analyzer, each of the social networks returns the requested data about the user (as shown by return paths 306, 308).

The returned data is typically provided in a propriety format or arrangement that may be unique to the given social network (see paths 310, 312). Accordingly, the social network analyzer 100 is adapted to convert or modify the returned data so that the data collected from the various social networks is conformed to a unified model that allows the data from the various sources to be combined together into a unified data set for the associated individual. With reference to FIG. 3, this normalization of the data returned from each social network may be carried out all or in part by the corresponding social network adapter receiving the data. For example, the data returned from Facebook 104a may be normalized (all or in part) by the Facebook social network adapter 206a (path 310) and the data returned from Twitter 104b may be normalized (all or in part) by the Twitter social network adapter 206b (path 312). In one embodiment, all or part of the process to normalize the collected data may be carried out by the data mapper 208 of the social network analyzer 100. As shown in FIG. 3, the normalized data (as well as the original data received from social networks) may be stored in a data repository 210 from where it can be retrieved for further analysis 314 or display/presentment 316. In one embodiment, third parties may be able to access the data stored in the normalization database 210 via the analytics API 212 of the social network analyzer 100.

Figure 4:
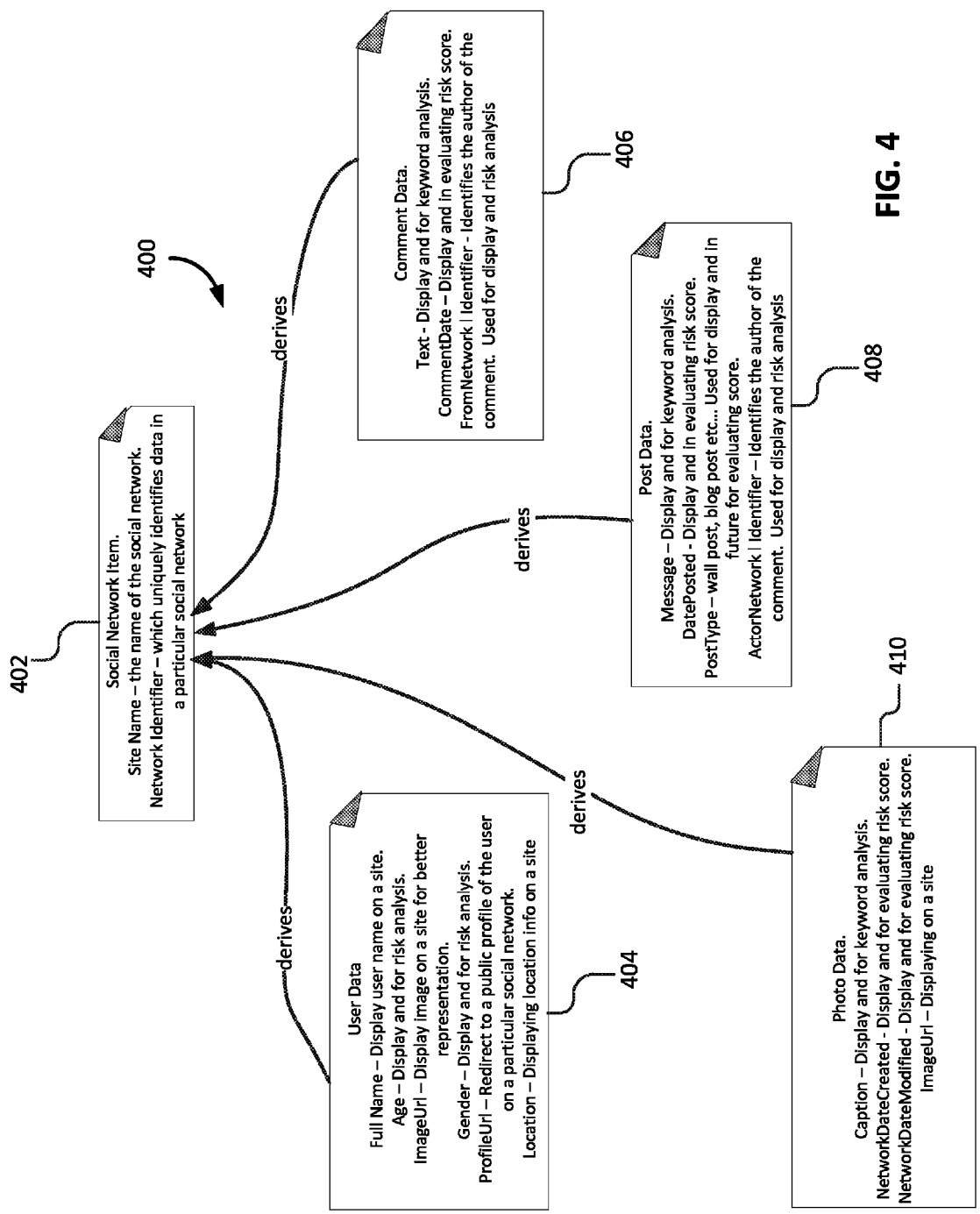
FIG. 4 is a conceptual representation of an illustrative normalized social network data model.

Generally speaking, the normalization of the data obtained from each social network involves mapping the various data elements of the collected data to a normalized data model. An exemplary normalized social network data model 400 is depicted in FIG. 4. The data model 400 comprises a number of attributes or elements 402, 404, 406, 408, 30. It should be understood that one of ordinary skill in the art that attributes may be added or removed to the data model and/or other suitable models may be implemented. Accordingly, for purposes of discussion herein, the attributes illustrated in FIG. 4 may also be referred to as the core attributes of the normalized data model. As shown in FIG. 4, each of the attributes comprises a number of properties or sub-elements that may be extracted or derived from the data obtained from the various social networks. It should be understood to one of ordinary skill in the art that not all social networks maintain data for all of the properties.

The Social Network Item 402 is a base attribute from which other core attributes may derive. The Social Network Item 402 may include two properties or sub-elements: SiteName and NetworkIdentifier. SiteName identifies the social network from which the data was obtained. Typically, the SiteName may comprise an alpha-numeric character string uniquely associated with the corresponding social network. As an example, the SiteName for the Facebook social network 104a may simply be the character string "facebook." The NetworkIdentifier uniquely identifies data in the associated social network and, typically, identifies a unique identifier ("unique ID") of a particular core attribute—such as, for example, a particular user/entity. In one embodiment, the Network Identifier may comprise the URL of the social network (e.g., www.facebook.com, www.twitter.com, etc.)

As indicated in FIG. 4, the User Data 404, Comment Data, Post Data 408, and Photo Data 410 attributes derive from the Social Network Item 402 attribute. As a result, by virtue of this derivation, each of these attributes 404, 406, 408, 410 contain the SiteName and NetworkIdentifier properties of the Social Network Item 402.

User Data attribute 404 of the normalized data model may be used to represent a particular user. The UserData attribute 404 may comprise a number of properties including, for example: (i) Full Name, (ii) Age; (iii) ImageUrl; (iv) Gender; (v) ProfileUrl; and (vi) Location.

Comment Data 406 may be used to represent a comment posted to a social network and may include the following properties: (i) Text; (ii) Comment Date; and (iii) FromNetworkIdentifier. The FromNetworkIdentifier property uniquely identifies the author of the comment.

The Post Data attribute 408 may be used to represent a post on a social network. Post Data 408 may include the following properties: (i) Message; (ii) DatePosted; (iii) PostType; and (iv) ActorNetworkIdentifier. The PostType property identifies the type of post (e.g., a wall post, blog post, etc.) The ActorNetworkIdentifier property uniquely identifies the author of the post.

Photo Data 410 may be used to represent a photo found on a social network. The Photo Data 410 attribute may include the following properties: (i) Caption; (ii) NetworkDateCreated; (iii) NetworkDateModified; and (iv) ImageUrl. The ImageUrl property refers to the public URL of the image on the social network.

Table 1 provides a summary of the various properties of the attributes shown in FIG. 4. The Uses column identifies exemplary potential uses of each of the properties for presentment 316 and/or analysis 314. It should be understood by one of ordinary skill in the art that there may be other uses of the properties in the context of the various embodiments disclosed herein.

TABLE 1

| Attribute Property | Description | Exemplary Potential Uses |
| --- | --- | --- |
| Social Network Item 402 | | |
| Site Name | The name of the social network. | Display site name. Identify the social network. |

TABLE 1-continued

| Attribute Property | Description | Exemplary Potential Uses |
| --- | --- | --- |
| Network Identifier | Unique identifier associated with the social network. May comprise a URL associated with the social network (e.g., www.facebook.com, www.twitter.com). May comprise a unique identifier used by the | Identify the social network. |
| User Data 404 | | |
| Full Name | Name of the user. This may be the actual name of the user or the user name used by the user in the given social network. | Display name or username of the user. Identify the user |
| Age | The age of the user. This may comprise the user's date of birth. | Display age of the user. Risk analysis. |
| ImageURL | The URL linked to an image associated with user or user name such as a profile image of the user | Display an image/photo of the user. |
| Gender | Gender of the user (e.g., male, female). | Display Gender of the user. Risk analysis. |
| ProfileURL | The URL linked to a public profile associated with the user/user name, the display of which display is not restricted by the user. | Display (e.g., redirect to the public profile of the user on a social network). Providing a link to the photo. |
| Location | Location information associated with the user. May comprise geographic, temporal and/or employment location for example. | Display information about the location of the user. |
| Comment Data 406 | | |
| Text | The actual text of a comment made within the social network. | Display. Keyword analysis. |
| CommentDate | The creation date of the comment. | Display. Risk analysis/evaluation. |
| FromNetworkIdentifier | The identity of the author of the comment. May comprise the author's user name or alias. | Display. Risk analysis. |
| Post Data 408 | | |
| Message | The actual text of a message posted in the social network. | Display. Keyword analysis. |
| DatePosting | The date the message was created/posted. | Display. Risk analysis/evaluation. |
| PostType | Describes the type of posted message (e.g., wall posting, blog posting). | Display. Risk analysis/evaluation. |
| ActorNetworkIdentifier | The identity of the author of the posted message. May comprise the author's user name or alias. | Display. Risk analysis. |
| Photo Data 410 | | |
| Caption | Text associated with a photo displayed in the social network. | Display. Keyword analysis. |
| NetworkDateCreated | Date the photo or caption text was created. | Display. Risk analysis/evaluation. |
| NetworkDateModified | Date the photo or caption text was modified. May include last modified date. | Display. Risk analysis/evaluation. |
| ImageURL | The URL linked to a photo displayed in the social network. | Display the photo (e.g., redirect to photo on the social network). Providing a link to the photo. |

Figure 5:
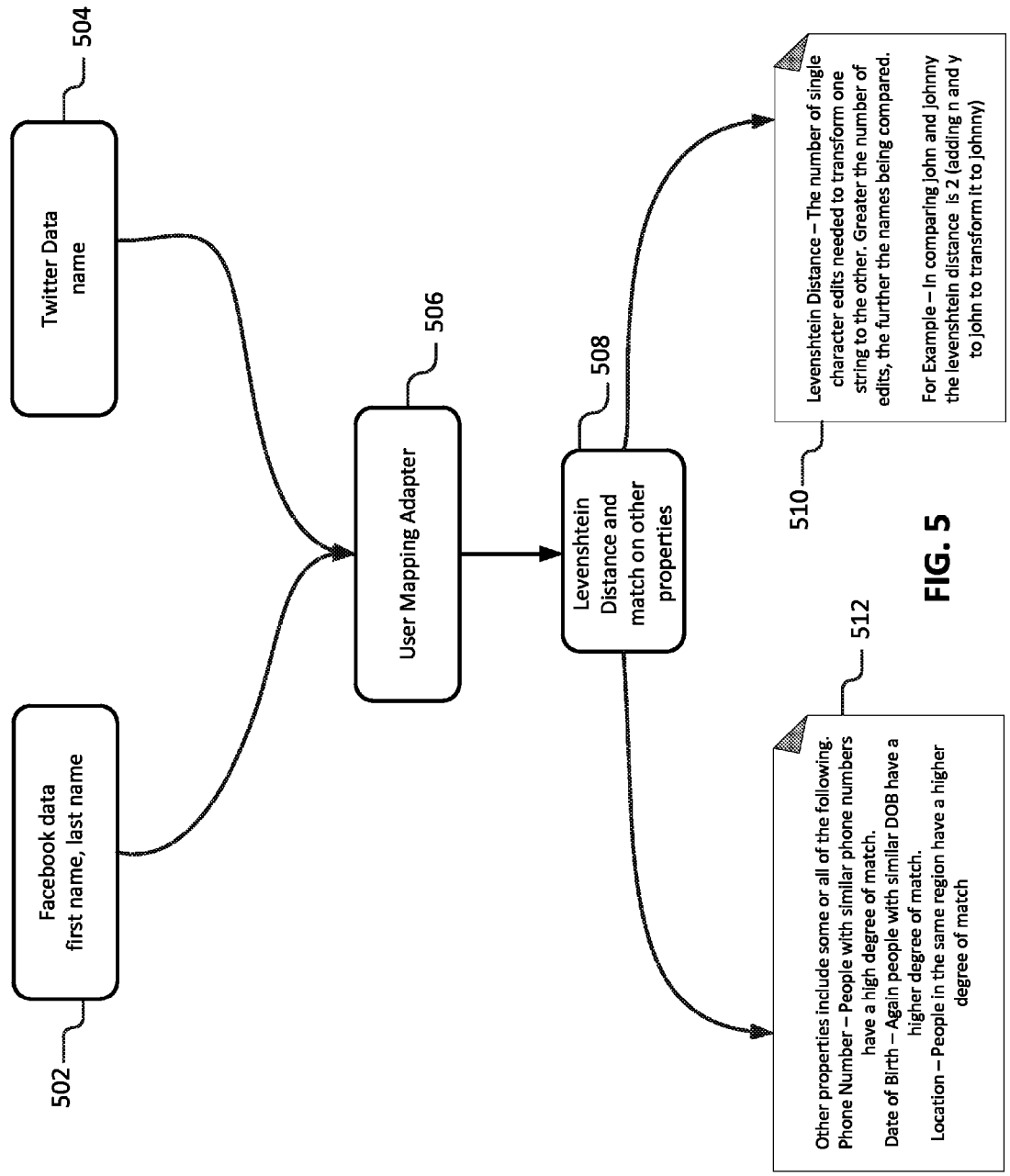
FIG. 5 is a process flow diagram for mapping data collected from a plurality of social networks to a single user in accordance with an illustrative embodiment.

FIG. 5 is a process flow diagram for a mapping data collected from a plurality of social networks to a single user in accordance with an exemplary social network analyzer embodiment. More particularly, the process flow depicted in FIG. 5, illustrates an exemplary process for mapping user data 502, 504 (in this case, user name and profile information) obtained from two illustratively social networks (in this example, Facebook and Twitter social networks—www.facebook.com and www.twitter.com) to a single person in accordance with a normalized data model. As shown in FIG. 5, the user data 502, 504 obtained from Facebook and Twitter is provided to a user data mapper 506 for comparison analysis A308. As previously described, the data mapper 506 may comprise the data analyzer 208 either alone or in conjunction with the social network adapters that were used to obtain the particular user data (e.g., the Facebook and Twitter social network adapters 206a, 206b in this particular example). The comparison analysis 508 performed by the data mapper 506 may utilize a variety of analytical techniques to try and map the collected sets of user data obtained from the various social networks to a single user or entity. For example, in the comparison analysis shown in FIG. 5, the analysis may include a Levenshtein-type distance analysis 510 (or Levenshtein distance analysis) and a similarity of data analysis 512 between the Facebook and Twitter sets of user data 502, 504.

A Levenshtein-type distance analysis may be used to compare the user names of the user data obtained from each of the social networks. In the example depicted in FIG. 5, the data mapper 506 may conduct a Levenshtein-type distance analysis 510 of the two user names obtained from the Facebook and Twitter social networks. In this example, the Levenshtein-type distance analysis 510 may comprise the number of single character edits needed to transform one character string into another character string—in this case the number of single character edits needed to convert the user name (or a least a portion thereof) from the user data obtained from the Facebook social network to the user name (or a corresponding portion thereof) from the user data obtained from the Twitter social network. The larger the number of edits required, the larger the Levenshtein distance between the two compared character strings. Thus, the larger the number of edits required, the further apart the user name obtained from the Facebook social network is from that obtained from the Twitter social network. With reference to the example shown in FIG. 5, there are two single character edits between the names "John" and "Johnny"—one for the additional "n" and one for the "y"—so that their Levenshtein distance=2.

The similarity of data analysis 512 may be used to compare various aspects of the user data collected from the plurality of social networks. For example, similarity analysis may be conducted to determine the similarity (or, at least, a degree of similarity) between comparable aspects of the user data such as, for example, a similarity comparison between date of birth information, phone numbers, and/or various location information (e.g., geographic location, network location, temporal location) obtained from the collected user data. The greater the similarity (or degree of similarity) between the collected sets of user data, the data mapper may determine that the more likely the various sets of user data obtained from the plurality of social networks are associated with a single person/entity. Continuing with the previously discussed John/Johnny example, if the phone numbers, birthdays and/or location information associated with the user name "John" obtained from Facebook is the same as that for "Johnny" obtained from Twitter, the higher the likelihood that "John" and "Johnny" are the same person. On the other hand, if the phone numbers, birthdays and/or location information are different, than the less likely the user data of "John" and "Johnny" are associated with the same person. It should be understood that this similarity analysis may be performed to provide some sort of degree of similarity (e.g., a percentage or rank of similarity) rather than a simple binary analysis (i.e., "match"/"does not match"). For example, if the date of birth information from the user data for "John" is "Jun. 23, 1980" while the date of birth information from the user data for "Johnny" is "June 23" but does not indicate the year, the similarity of data analysis 512 may still assign a percentage or other degree of confidence indicating a relatively strong similarity between the two birthday dates.

Figure 6:
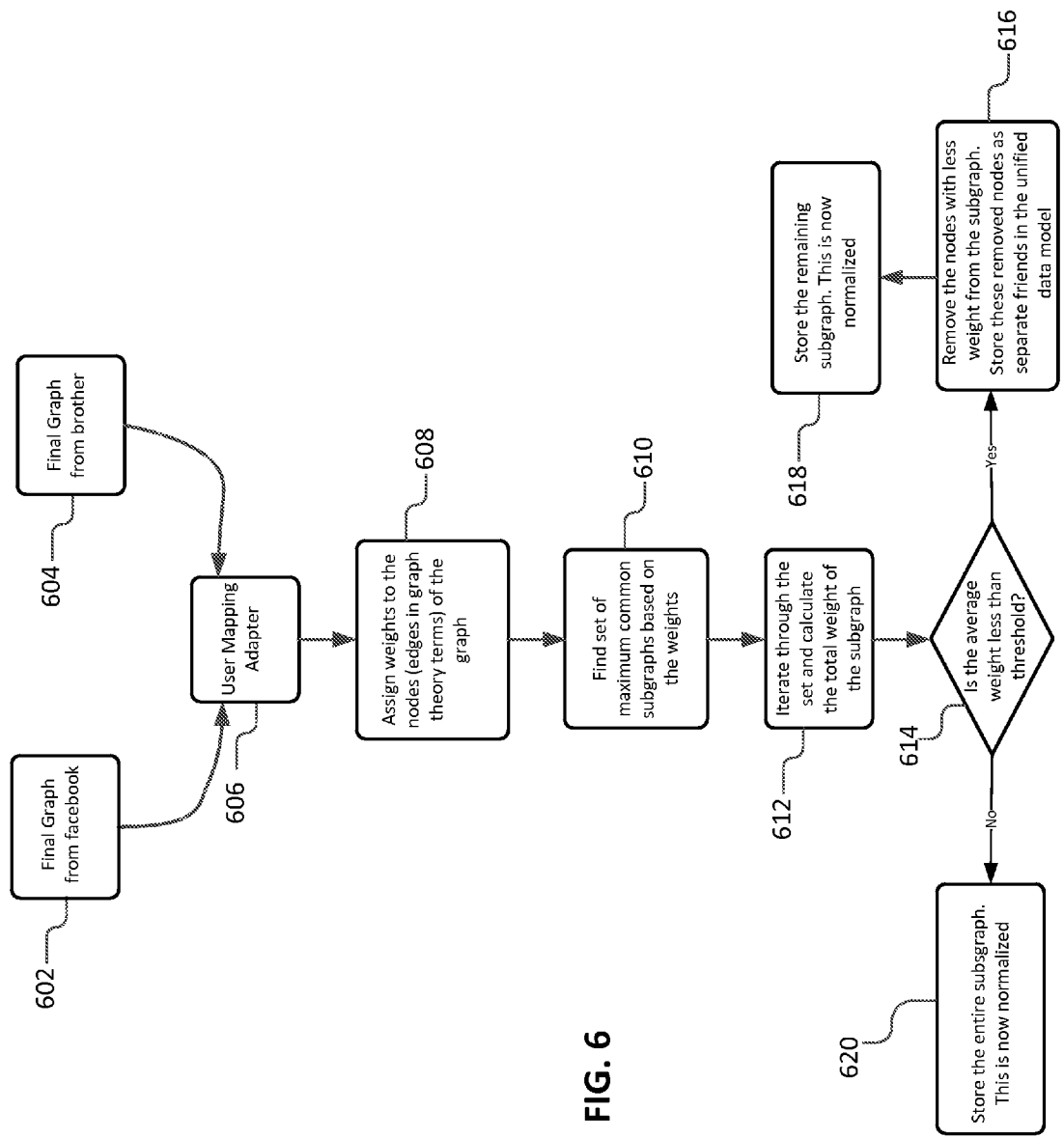
FIG. 6 is a process flow diagram for normalizing social graph information obtained from a plurality of social networks in accordance with an illustrative embodiment.

FIG. 6 is a process flow diagram for normalizing a single user's social graph information obtained from the user's a plurality of social networks using a social network analyzer in accordance with an illustrative embodiment. In the illustrative example depicted in FIG. 6, the social network analyzer 100 obtains social graphs 602, 604 (also known as sociograms or friend graphs) from a user's data collected from the two exemplary social networks—the Facebook and Twitter social networks—discussed in the previous example with reference to FIG. 5. The social graphs 602, 604 are provided to the data mapper 606 for normalization.

In operation 608, the data mapper 606 analyzes each of the provided social graphs 602, 604 to assign weights to the nodes of the social graphs in order indicate the degree of match of each friend found present in the two social graphs. This operation is further discussed with reference to FIG. 7. In FIG. 7, two exemplary social graphs of a single user are illustrated—a first social graph 702 of the user obtained from the Facebook social network and a second social graph 704 of the user obtained from the Twitter social network. In each social graph 702, 704, individuals or entities are represented as circular nodes. The nodes of the first social graph 702 are labeled with an "f" to indicate that they are associated with the first social graph 702 and the nodes of the second social graph 704 each labeled with an "t" to indicate that they are part of the second social graph 704. The two nodes labeled with the designation "So" are the source nodes of the social graphs. The source nodes "fSo" and "tSo" are those nodes that are associated with the user whose user data has been obtained from the two social networks and analyzed by the social network analyzer 100. The other nodes in each social graph 702, 704 are those individuals or entities that are friends of the user (i.e., friends of the user identified as the source node). As depicted in the illustrative embodiment shown in FIG. 7, there are five "friend" nodes—fA, fB, fC, fD, fE—in the first social graph 702, and six "friend" nodes—fA, fB, fC, fD, fE', fX—in the second social graph 704.

Using the two illustrative social graphs depicted in FIG. 7, in order to assign weights to the nodes in accordance with operation 608, the data mapper 606, compares the nodes of the first social graph 702 to those of the second social graph 704 in an attempt to match nodes common to both social graphs 702, 704. This matching may be attempted for source nodes, friend nodes, or both types of nodes. In accordance with one embodiment, the data mapper may iterate through the nodes of both social graphs 702, 704 and compare the user names (or other identifiers) of each node in one social graph to the user names of the nodes in the other social graph. Those nodes that have user names (or corresponding identifiers) in the two social graphs 702, 704 that are exact matches are paired together and are each given a weight of "1" (representing a percentage of 100%). For example, in FIG. 7, the nodes-pairs fSo(1)-tSo(1), fA(1)-tA(1), fB(1)-tB(1), fC(1)-tC(1), and fD(1)-tD(1) all have been given a weight of "1". In accordance with the illustrative embodiment that matches nodes by user name, this indicates that the user names of source nodes fSo and tSo have been determined to be exact matches, the user names of friend nodes fA and tA have been determined to be exact matches, the user names of friend nodes fB and tB have been determined to be exact matches, the user names of friend nodes fC and tC have been determined to be exact matches, and the user names of friend nodes fD and tD have been determined to be exact matches (as indicated by the "(1)" displayed in each of these nodes). For example, if nodes fA and tA both share the exact same user name "John Smith", then the data mapper 606 would assign a confidence score of "1" to both nodes fA and tA. It should be understood, that with at least with respect to source nodes, other techniques or information may be used for determining whether a node in one social graph matches a node in the other social graph. For instance, the data matching techniques discussed with reference to FIG. 5 may be used to determine whether a node matches another node.

For those nodes in one social graph that are determined not to have an exactly matching node in the other social graph, the data mapper 606 may assign a value lower than "1" to these nodes with decreasing values indicating a lower probability of a match between the two nodes. For example, in FIG. 7, node pair fE(0.5)-tE'(0.5) have been given a weigh of "0.5" indicating a particular degree of matching. This value may be calculated using, for example, the methods discussed with reference to FIG. 5 such as, for instance, a Levenshtein distance analysis between the user names of nodes fE and tE'. As shown in FIG. 7, those nodes determined not to have any corresponding node or that do not match any other node—such as node tX in the second social graph—are given no weigh (i.e., 0 weight).

After weights have been assigned to the node/nodes-pairs, the data mapper may then analyze the social graphs 702, 704 in operation 610 to identify the set of maximum common subgraphs based on the determined weights (per operation 608) in the social graphs. In the two exemplary social graphs of FIG. 7, there are two maximum common subgraphs. These two maximum common subgraphs 802, 804 are illustrated in FIG. 8. The first maximum common subgraph 802 found in both social graphs 702, 704 comprises the subgraph between nodes So, A, B, and E and the second maximum common subgraph 804 comprises the subgraph between nodes C and D.

In operation 612, the data mapper 506 iterates through the subgraphs in the set of maximum common subgraphs found between the two social graphs 702, 702 in operation 610 and calculates the total weight in each subgraph. Continuing with example depicted in FIG. 7 and FIG. 8, the weights of nodes So, A, B, and E comprise a first maximum common subgraph 802 are added together to a obtain a sum of 3.5 (1+1+1+0.5=3.5) for the first subgraph 802. Similarly, the weights of nodes C and D comprising the second maximum common subgraph 804 are added together to obtain a sum of 2 (1+1=2) for the second subgraph 804.

For each common subgraph 802, 804, the average weight of the nodes comprising the subgraph is calculated by dividing the sum of the weights of the nodes in the subgraph by the number of nodes in the that subgraph. For example, the average node weight in the four-node subgraph 802 is 0.875 ((sum weight of nodes of subgraph)/(number of nodes in subgraph)=3.5/4=0.875) and the average node weight in the two-node subgraph 804 is 1 ((sum weight of nodes of subgraph)/(number of nodes in subgraph)=2/2=1).

In decision 614, the average weight of each common subgraph is compared by the data mapper against a threshold value. If the average node weight for any of the common subgraphs is determined in decision 614 to be less than the threshold, then the YES path is followed to operation 616. In operation 616, the nodes with lower weights are removed from the common subgraphs. These removed lower-weight nodes as well as any unpaired/matched nodes from the analyzed social graphs are stored as separate friends in the unified social graph data model. In operation 618 the remaining portion of the common subgraph(s) are stored as a single, normalized social graph. Similarly, if in decision 614, the average node weight for all of the common subgraphs are determined to be greater or equal than the threshold, then the NO path is followed to operation 620 in which all of the nodes of the common subgraphs are stored as the single, normalized social graph (with any unmatched nodes being stored as separate friend nodes in the combined, normalized social graph).

Continuing with the illustrative embodiment depicted in FIG. 7 and FIG. 8, if the average node weight threshold is 0.9, for example, then the average node weight for the four-node subgraph 802 is less than the threshold (0.875<0.9) and the average node weight for the two-node subgraph 804 is above the threshold (1>0.9). Accordingly, the YES path is followed to operation 616 and node "E" of the common four-node subgraph 802, is removed from the subgraph because it is the node with the lowest weight in the subgraph (i.e., a weight of 0.5 versus a weight of 1 for nodes A, B, and So). Nodes fE and tE, as well as unpaired node tX are then stored as separate friends of So in the normalized data model of the user So's social graphs. Each of the remaining nodes—A, B, C and D—are each stored as single friend nodes of So in the normalized data model of user's So's social graphs. As a result, the normalized data model of the social graphs for the user So across two social graphs "f" 702 and "t" 704 in this example would be A, B, C, D, fE, tE, and X. With reference to FIG. 2 and FIG. 3, the normalized data model for social graphs "f" 702 and "t" 704 may be stored in the normalized data store 210 for subsequent presentment 316 via the analytics API 212, for example.

Figure 9:
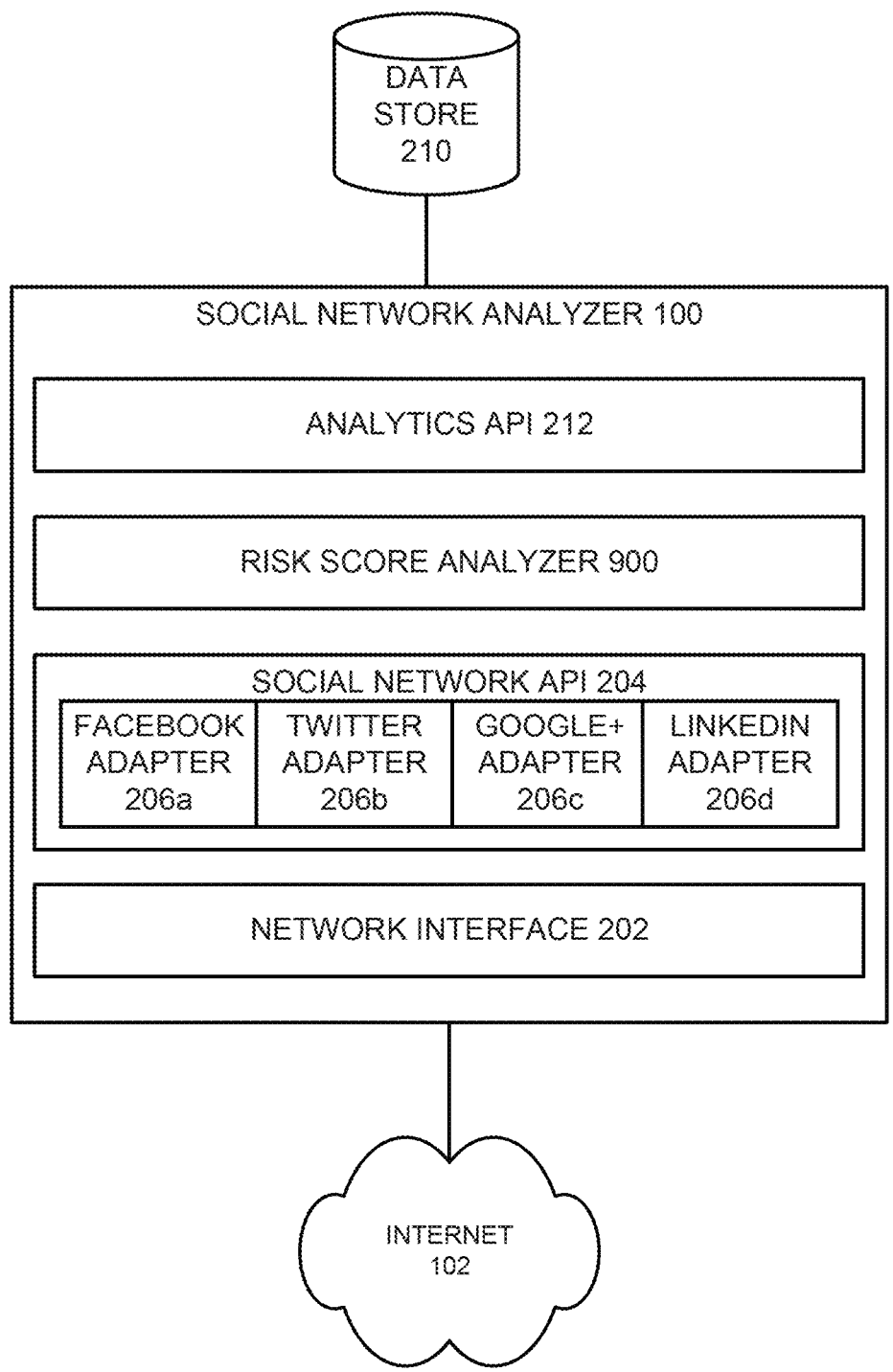
FIG. 9 is a block diagram of an exemplary social network analyzing service that may be implemented to assess a level of risk to a user of social networks.

FIG. 9 is a block diagram of an implementation of the social network analyzer 100 that may be implemented to assess a level of risk to a user of social networks. As previously discussed with reference to FIG. 2, the social network analyzer 100 may include a network interface 202 adapted for interfacing with one or more networks 102 including the Internet, for example, in order to allow the social network analyzer 100 to communicate over the network(s) with other sites or nodes connected to the network—including social networking sites. The social network analyzer 100 may also have a social network API 204 that, as previously discussed with reference to FIG. 2, may include a plurality of social network adapters adapted for communicating with an associated social network so that each social network adapter may retrieve information from its associated social network—including information and data about individual users of the social network.

In addition, the social network analyzer 100 may also include a risk score analyzing component 900 ("risk score analyzer") that is adapted to perform various analyses on data collected from the network 102 about a person or entity involved in social networking. In accordance with one embodiment, the risk score analyzer 900 may be implemented or be combined with at least a part of the data analyzer/mapper 208 depicted in FIG. 2. It should also be understood to one in the art that embodiments of the social network analyzer 100 may be practiced where either the risk score analyzer 900 is implemented without the presence of the data analyzer 208, and vice versa. Moreover, it should be understood to one in the art that embodiments may be implemented where separate social network analyzers are implemented with at least one social network analyzer implementing the risk score analyzer 900 and at least one other social network analyzer implementing the data analyzer 208. Further, it should also be understood that the risk score analyzer 900 may be implemented separately from the social network analyzer 100. For example, the analysis provided by the risk score analyzer 900 may comprise at least a portion of the further analysis 314 as previously mentioned with reference to FIG. 3. In such an embodiment, the risk score analyzer 900 may obtain data and other information from the social network analyzer 100 via the analytics API 212 shown in FIG. 2.

The risk score analyzer 900 may be used to provides a means for assessing the level of risk of a person's activities online in the aggregate by calculating a risk score for the person's online activities. The risk score analyzer 900 may use the following inputs in order to calculate such as risk score:

Input 1—Warnings about the person: The person's online information may be collected and analyzed for any potential dangers to the person's potential safety and/or reputation. Such online information may be obtained, for example, from a website that discloses personal information about the person in question.

Input 2—Warning Severity Matrix: A function ("S(w)") which assigns a severity level to each given warning.

Input 3—Severity Weighing Matrix: A function ("M(w, s, a)") which assigns a weight to each warning based on the warning's age and severity level.

The risk score analyzer 900 may use at least a portion of these inputs to calculate an aggregate risk score (or simply a "risk score") for the person being analyzed. In accordance with one embodiment, the risk score may be calculated in the following manner. For each warning, the risk score analyzer 900 may use the Warning Severity Matrix to assign a severity level to the warning. The severity level may be a numerical value (e.g., For a warning "a", the risk score analyzer 900 may assign a severity level equal to a value "x"). The risk score analyzer may then use the Severity Weighing Matrix to assess a weighted score to the warning based on its assigned severity level and, as a further option, the age of the warning. The risk score analyzer 900 may then calculate the risk score for the person as the aggregate of the weighted scores for all the warnings associated with that person. The aggregate function may be, for example, an average of the weighted scores or the sum of the weighted scores for that person.

As previously discussed, the social network analyzer 100 may also be provided with or coupled to a data storage device 210 in which data may be stored and retrieved by the social network analyzer 100 and the various components thereof including the risk score analyzer 900. Thus, data stored in the data storage device 210 may include the raw data retrieved from the network and the social network sites, data input to and/or output from the risk score analyzer 900 including the Warning Severity Matrix, Severity Weighing Matrix, and information about warnings, severity levels, weightings, ages, risk scores discussed herein.

Figure 10:
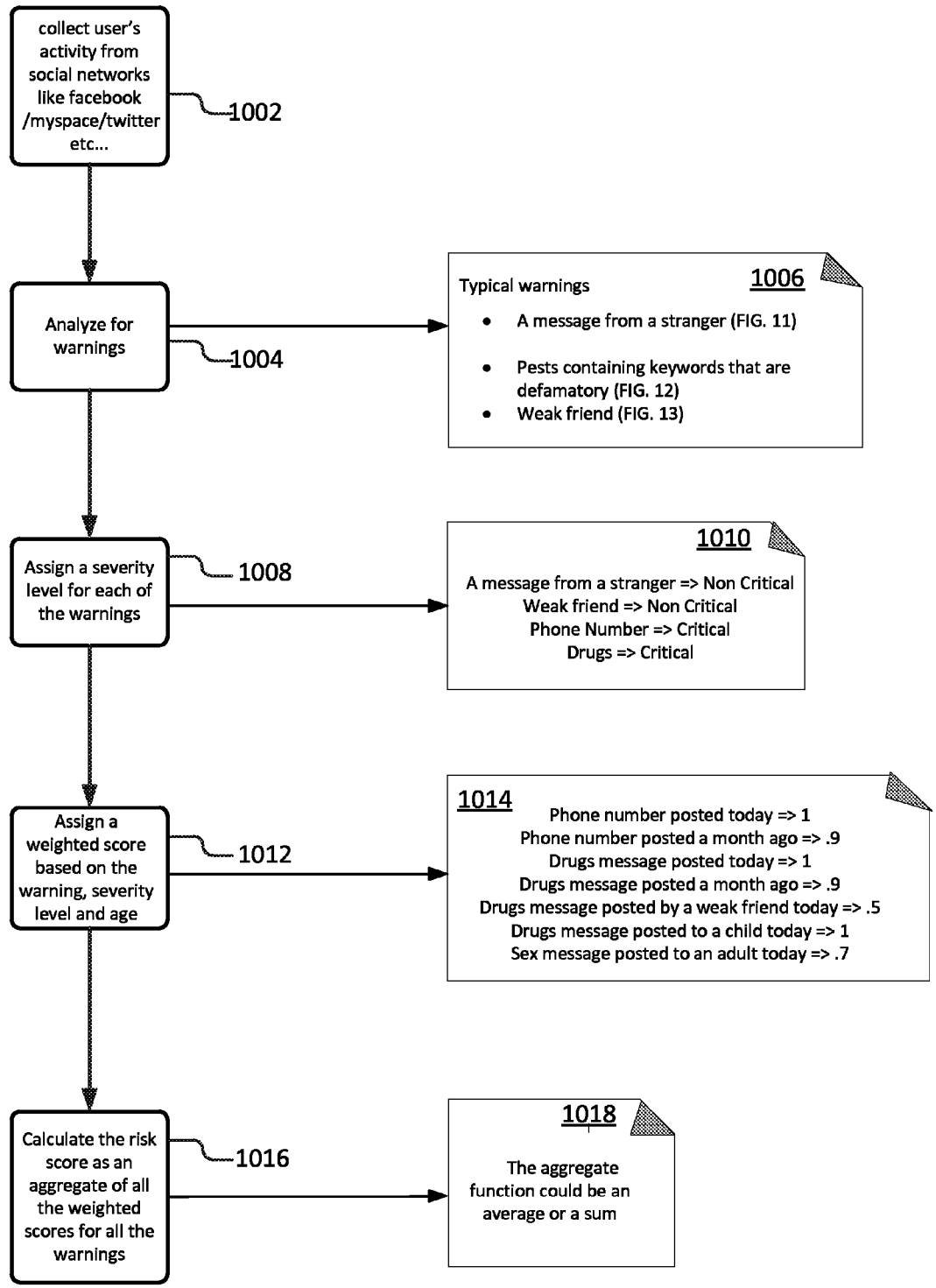
FIG. 10 is a flowchart of a process for assigning a risk score to a user of social networks in accordance with an illustrative embodiment.

FIG. 10 is a flowchart of a process 1000 for assigning a risk score to a user of social networks in accordance with an illustrative embodiment. In operation 1002, information about a person's (or entity's) online activities is collected from the network. This collection may be performed using the social network analyzer 100 and/or the components thereof as discussed herein. In one embodiment, the collected information may include information associated with the person (who may also be referred to herein as the "subject", "subject person" or "user") collected from one or more social networks such as, for example, Facebook, Twitter, Google+, MySpace, Formspring, Instagram, and the like. The collected information may include, for example: (i) postings, comments and other messages made by the subject person; (ii) postings, comments and other messages made by other users known to the subject person (e.g., friends or associates of the subject person); (iii) postings, comments and other messages direct to the subject person (i.e., postings not made by the subject person); and (iv) images, photos, videos posted by the subject person or that have been tagged to indicate that user is included therein or associated therewith. In accordance with one embodiment, the subject person may authorize the social network analyzer 100 to collect his or her information from a particular social network. For example, the person may grant to the social network analyzer 100 permission to fetch his or her posts, comments, friends list, photos, videos, etc. from the Facebook social network. The social network analyzer 100 may then utilize the appropriate aspects of its social network API to access and retrieve the authorized information from the Facebook social network—with the social network allowing access to this data (based on the subject person's permissions) via the social network's API, for example. The collected information may also be stored in the data store 200 of the social network analyzer 100.

In operation 1004, risk score analyzer 900 analyzes all of the collected data (or at least a portion of the collected data) in order to identify any potential warnings/threats that may be contained in the collected information. As shown in box 306, some exemplary warnings may include: (i) a message from a stranger (e.g., a message from someone that is not a "friend" or "approved" by the subject person and/or a person that is not known to the subject person); (ii) a post containing one or more keywords (e.g., words that have been flagged as defamatory, threatening, inappropriate, obscene, etc.); and (iii) a "weak friend" of the subject person.

In operation 1008, the risk score analyzer 900 utilizes the Warning Severity Matrix ("function S(w)") to assign a severity level (or criticality level) for each of the warnings/threats identified in operation 1004. In one embodiment, Warning Severity Matrix may comprise a table or similar data structure containing a variety of different types or kinds of warnings/threats and a corresponding level of severity assigned to each type of warning (see, e.g., box 1010). Table 2 illustrates an exemplary Warning Severity Matrix for a set of illustrative types of warnings.

TABLE 2

| Type of Warning/Threats | Severity Level |
| --- | --- |
| Warnings from a Stranger (such as, e.g., Messages, Postings, Comments from a Stranger to or directed to the Subject Person) | Non-Critical |
| Warnings associated with a Weak Friend of the Subject Person | Non-Critical |
| Warnings containing the Phone Number of the Subject Person | Critical |
| Warnings containing a Mention or Reference to Drugs | Critical |
| Warnings containing a particular Slang Term | Critical or Non-Critical (depending on the Slang Term) |

As shown in Table 2, each type of warning has an severity level associated with it—some warnings are classified as "Critical" and others as "Non-Critical". In some embodiments, the level of criticality may be multi-tiered (such as, e.g., "Very Critical", "Critical", "Moderately Concerning", "Concerning", "Non-Critical") or on a numerical sliding scale (such as e.g., "100" being the most critical and "0" being the least critical—i.e., non critical and/or unimportant).

The severity levels associated with the various types of warnings can be customized to suit the particular application or subject person. As depicted in the example in Table 2, messages from strangers and weak friend warnings have been assigned a "Non-Critical" severity level and warnings containing a particular phone number (in this case a phone number of the subject person) or a reference to a drug(s) (e.g., illicit drugs) have been assigned "Critical" severity level. In the case of warnings containing a certain phone number, these warnings may be critical because of the high potential of misuse or abuse of the phone number by others (such as, e.g., threatening or harassing calls). In the case of warnings mentioning drugs, such warnings may be critical because they may indicate the occurrence or threat of potentially illegal, threatening or risky behavior (such as, e.g., threats of violence/intimidation, sexual content/language). As shown in Table 2, warnings containing certain slang terms may be assigned a higher level of severity than those containing other slang terms. As another example, different levels of severity can be assigned to a warning carrying a mention of alcohol for adult and child subjects (e.g., less critical for adults and more critical for children). As a further example, different While the social network analyzer 100 may set these values, in some embodiments, the social network analyzer 100 may allow the subject person (or other user—e.g., a parent or guardian) to customize the setting of the severity levels to suit their particular needs or desires. This may be accomplished by including a network-accessible interface to the subject person or authorized user to adjust the settings of the severity levels and even add additional types of warnings to the matrix.

Because the types of warnings may evolve over time, the social network analyzer 100 may—depending on the circumstances or implementation—periodically or continually update the contents of the Warning Severity Matrix over time as new types of warnings come up. For example, slang terms/phrases are constantly changing and their significance can be more or less important (or critical) over time and/or generation (such as e.g., teenagers' use versus parents' use of the term or phrase). In order to keep up with the constantly evolving severity levels, the social network analyzer 100 may utilized crowd-sourcing to identify and input new warnings and potential severity levels for these warnings into the Warning Severity Matrix. This input may be accomplished by providing third-parties access to the Warning Severity Matrix via an appropriate API to the social network analyzer 100 such as, for example, via the analytics API 212.

Next, in operation 1012, the risk score analyzer 900 utilizes the Severity Weighing Matrix ("function M(w, s, a)") to assign a weighed score to each collected warning. The weighed score may be based on the particular type of warning, the severity level assigned to that warning (per operation 1008) as well as the age of the warning. In one embodiment, the age of the warning may be determined from the date that the warning was created and/or last modified online.

Block 1014 in FIG. 10 contains illustrative weights assigned to some exemplary phone number-containing warnings, drug-related warnings, and warnings with sexual content. As shown in FIG. 10, a warning comprising a phone number posted to a site on current or present day (i.e., "today" or the same day that warning is obtained by the social network analyzer 100) may be given a higher weight, for example, a weight=1.0 because it has a critical severity level and this warning/information is current (i.e., very recent). In contrast, a phone number warning posted some time period before the current/present day may be a lower weight. For example, as shown in lock 1014, a phone number warning posted a month ago may be given a slightly lower weight=0.9 than a current phone number warning because of its age.

Block 1014 also depicts four exemplary warnings classified as drugs related. The first drugs-related warning is a message containing a drug reference posted "today" and is given a weight=1.0 because it is a critical warning and is a very recent warning (i.e., a current warning). The second drugs-related warning is a message containing a drug reference posted a month ago and, therefore, may be given a slightly lower weight=0.9 than a current drugs-related message because of its age (as well as it being classified as a critical warning). The third exemplary drugs-related warning is a message containing a drug reference posted "today" by a person classified as a "weak friend" of the subjection person. Although this warning is a drugs-related message (which are classified as a critical warning), because it was posted by a weak friend, it may be given a mid-level weight=0.5 to reduce its importance when compared to a situation where a similar message had been posted by a closer friend of the subject.

The fourth exemplary drugs-related warning is a message containing a drug reference posted to a child today. This message may be given a higher weight=1.0 because it of critical level (because it is a drug-related warning) and it has been directed to a minor. The last warning in block 1014 is a message or posting containing a reference to sex that has been directed to an adult today. Because it is posted to an adult, sex-related warnings (an even drugs-related warnings) may be given a lower weight, such as for example, a weight=0.7. As indicated by these examples, different weightings may assigned depending on whether the message has been posted by or directed to a minor as opposed to an adult: a child having posts containing words relating to drugs or sex may be considered very risky in certain implementations.

In operation 1016, the risk score analyzer 900 calculates a risk score for the subject person. The risk score may comprise an aggregate of the weighted scores of at least some or all of the weighted warnings. As indicated in block 1018, the aggregate score may be calculated as a sum of all or at least a portion of the weighed warnings calculated in operation 1012 or as an average of all or at least a portion of the weighed warnings, or a combination of sums and averages—as may be deemed suitable for the particular implementation. In some embodiments, the aggregate score may be presented to the subject or a user of the social network analyzer as a single score.

Figure 11:
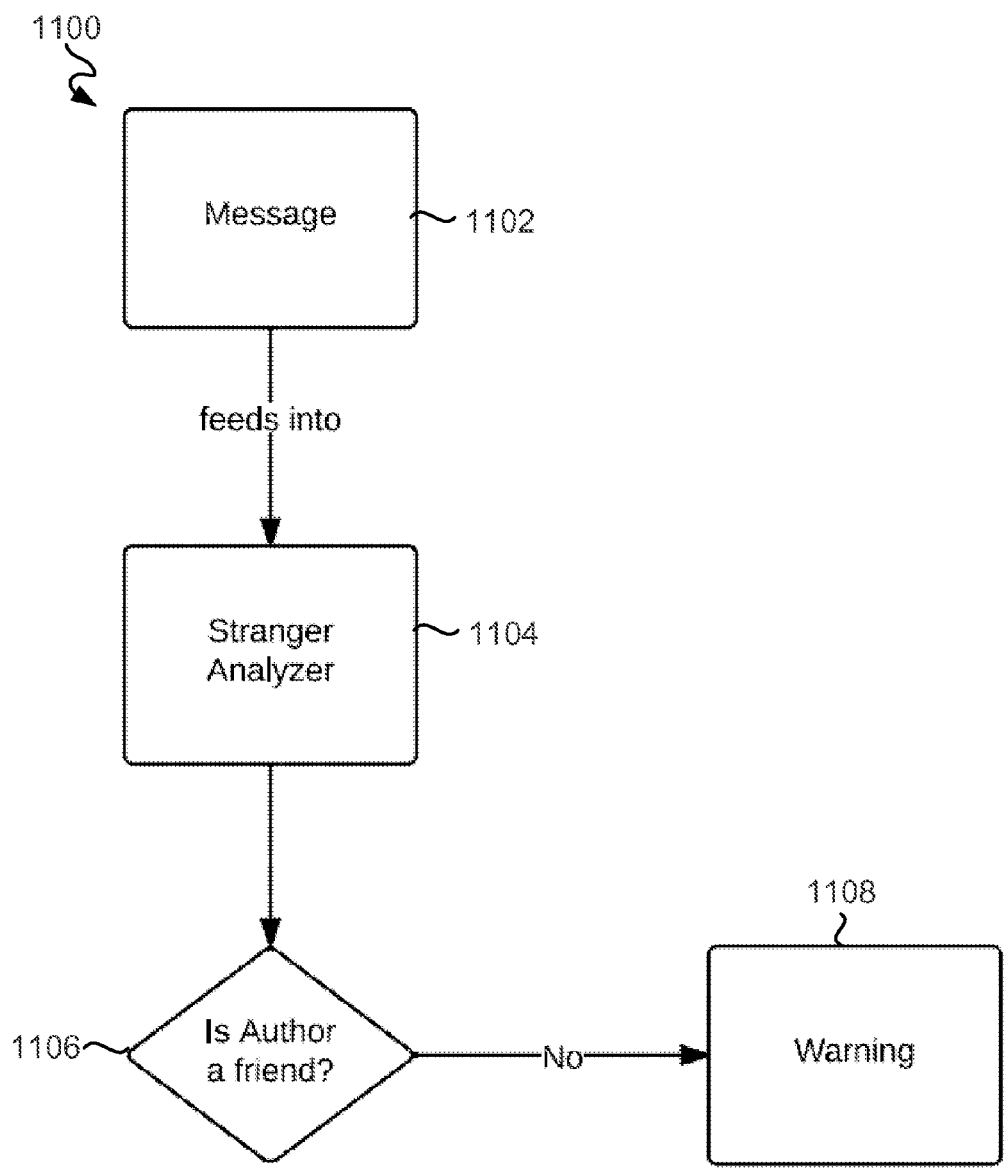
FIG. 11 is a flowchart of an exemplary stranger threat analysis process.

FIG. 11 is a flowchart of an exemplary stranger threat analysis process 1100 that may be utilized during the analysis of warnings in operation 1004 of FIG. 10. This process may be performed to messages, postings, comments, etc. made by persons other than the subject person's friends or authorized associated in the social network. In operation 1102, the messages are provided to a stranger analyzer 1104 which may comprise a portion of the risk score analyzer 900 which scans the message to determine whether the author of the message is a known friend or authorized associate of the subject person. If the author is not a known friend or authorized associate (see decision 1106), the message is determined to be a message from a stranger and designated as a stranger warning in operation 1108.

Figure 12:
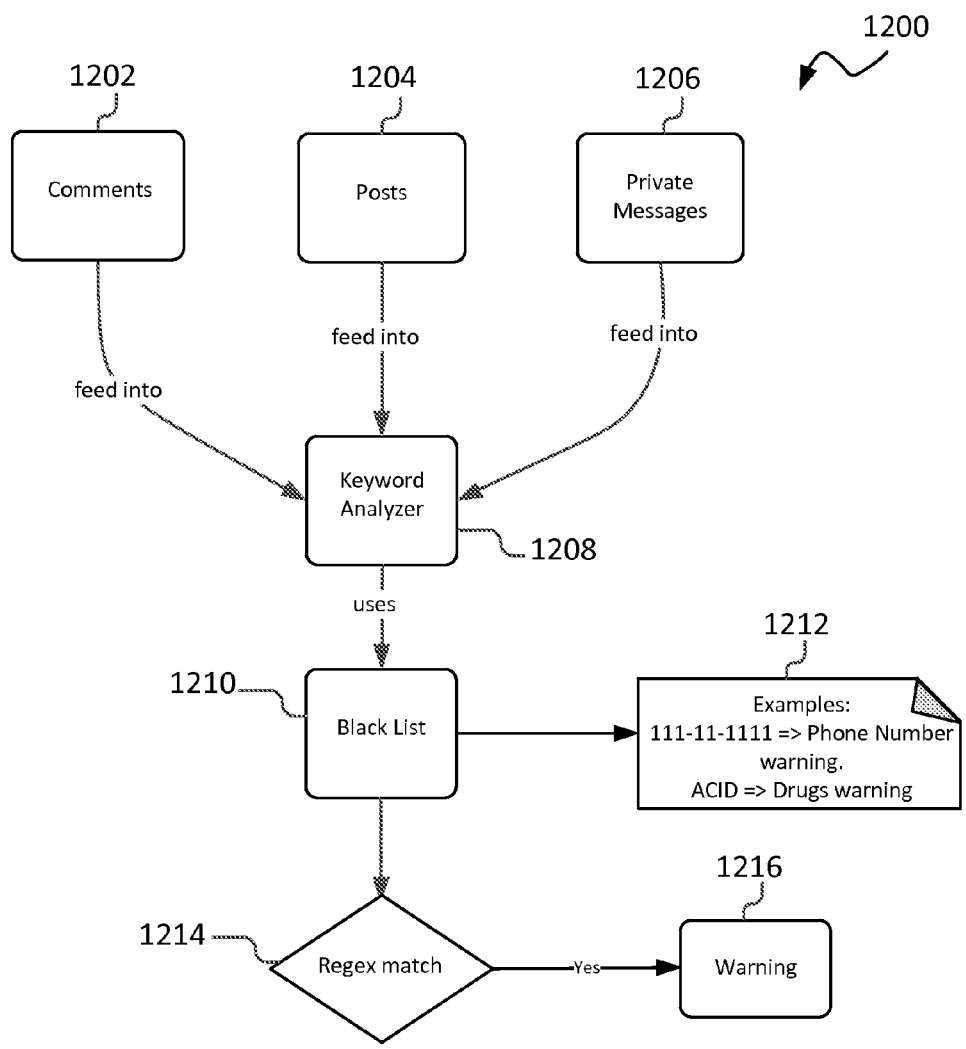
FIG. 12 is a flowchart of an exemplary keyword threat analysis process.

FIG. 12 is a flowchart of an exemplary keyword threat analysis process that may be implemented to analyze postings and other messages for threatening and other keywords of interest during the analysis of warnings in operation 1004 of FIG. 10. This process relates identifying and flagging warnings containing certain abusive words or personal information being posted to the subject person. As shown in FIG. 12OO, different comments 1202, posts 1204, and messages 1206 may be provided to a keyword analyzer component 1208 of the risk score analyzer 900. The keyword analyzer component 1208 may rely on a dictionary of blacklisted words 1210 (and their corresponding regular expressions (see, e.g., block 1212)) to identify messages containing any of these blacklisted words (see decision 1214) as messages that contain defamatory content, references to drugs, references to sex and/or containing phone numbers associated with the subject person. Those messages identified as having text or words matching one or more words in the blacklist dictionary 1210 may then be marked as warnings containing the identified words (e.g., drugs related warnings, sex related warnings, warnings containing phone numbers of the subject person, warnings containing other threats or blacklisted words).

Figure 13:
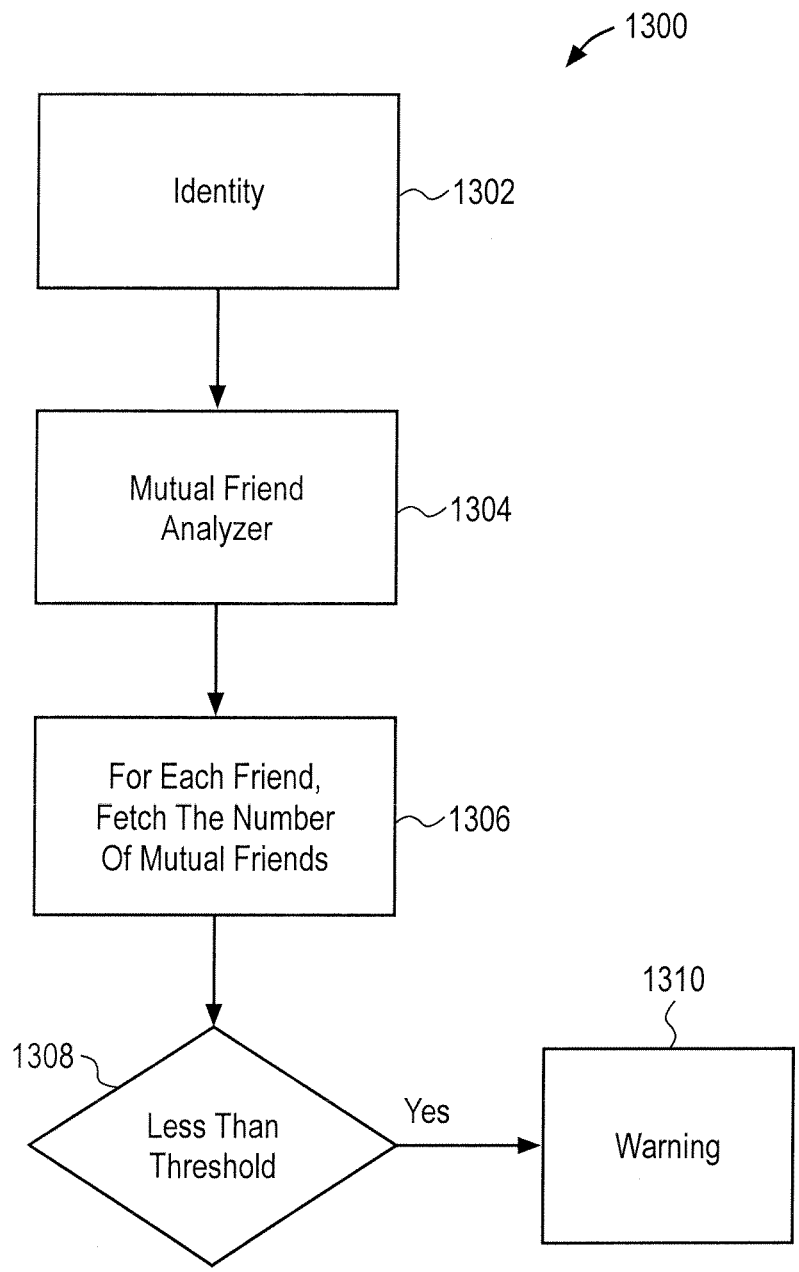
FIG. 13 is a flowchart of an exemplary relationship strength assessment process.

FIG. 13 is a flowchart of an exemplary relationship strength assessment process 1300 in order to determine whether a warning is from a weak-friend of the subject person in operation 1004 of FIG. 10. In this process 1300, authors of messages, postings are identified in operation 1302. Along with this information, the friends and authorized associates of the subject person are obtained and provided to a mutual friend analyzer component 1304 of the risk score analyzer 900. The mutual friend analyzer component 1304 iterates through all the provided friends of the subject person and calculates the number of mutual friends that each friend shares with the subject person in operation 1306. If this number each of mutual friends is less than a threshold number of friends (i.e., less than a predetermined number of mutual friends) (see decision 1308), then those messages authored by persons with numbers less than the threshold number of mutual friends with the subject person are designated as warnings from weak friends in operation 1310.

Figure 16:
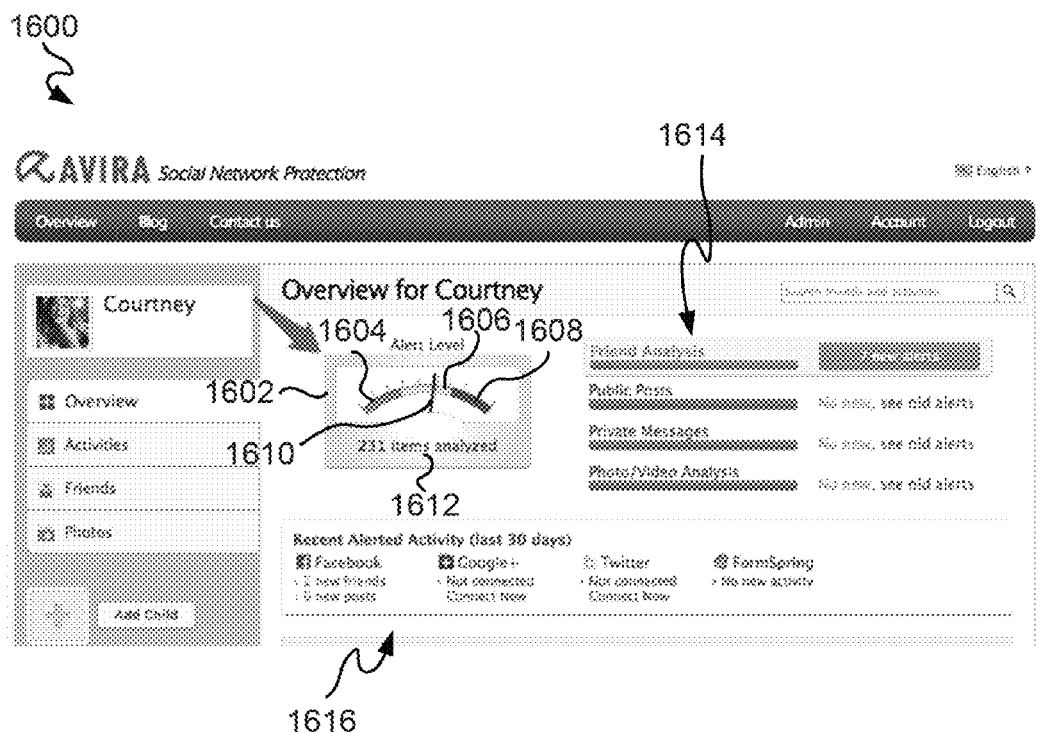
FIG. 16 is an exemplary screen displaying an aggregate risk score for an illustrative user in accordance with one embodiment.

FIG. 16 is an image of an exemplary screen 1600 that may be presented to an illustrative user of social networks (named "Courtney") by the social network analyzer 100 for displaying information relating to a risk score attributed to the user's social network activities. As shown in FIG. 16, the screen 1600 may provide an overview of the risks arising from the user's online activities. For example, the screen may include an image and/or indicia that indicate the aggregate risk for the user's online activities—shown in this example via an Alert Level image 1602. In this exemplary embodiment, the Alert Level image 1602 displays a color graduated bar ranging— from left to right—a low aggregate risk score range 1604, a middle aggregate risk score range 1606, and a high aggregate risk score range 1608. A pointer 1610 is also displayed to indicate the aggregate risk score of the user within the displayed range.

The displayed ranges 1604, 1606, 1608 may be color coded for assisting visual interpretation of the score. For instance, the low aggregate risk score range 1604 may be colored green, the middle aggregate risk score range 1606 may be colored yellow, and the high aggregate risk score range 1608 may be colored red in a manner similar to a traffic signal with green representing OK or low risk, the yellow representing moderate risk and the red representing high or dangerous risk. In the embodiment shown in FIG. 16 the ranges 1604, 1606, 1608 are generally equal size in length but it should be understood that the ranges may be of differing lengths as suited for the particular implementation. The overall range of the three displayed ranges may also be associated with particular values such as, for example, an aggregate risk score between a low value=0 (indicating a very low risk) to a value=100 or 100% (indicating a very high risk) the left). Alert Level image may also display indicia 1612 and/or images that indicate the number of warnings that were analyzed to derive the aggregate risk score (e.g., a number of online items or instances analyzed).

The screen 1600 may also include areas for displaying summaries 1614 of the different types of warnings analyzed (e.g., friend analysis, public posts, private messages, photo/video analysis) and whether any new warnings of a given type have been analyzed to compute the aggregate risk score displayed in the Alert Level 1602 since the last time the user accessed the screen 1600. The warnings summary area 1614 may also include selectable links that permit the viewer to access information about the particular warnings that have been analyzed. As represented in the embodiment depicted in FIG. 16, these links may permit selected viewing of new warnings and older warnings.

The screen 1600 may also display a summary of recent alerted activities 1616 that provides a summary of warnings broken down by particular social networks with whom the user has an account. For example, in the example shown in FIG. 16, user "Courtney" has accounts with the Facebook, Google+, Twitter and FormSpring social networks so summaries of recent activities and/or warnings for each social network may be displayed in the summary of recent alerted activity 1616 portion of the screen 1600.

The various embodiments of the social network analyzer 100 with a risk score analyzer 900 may be utilized to provide a concise and predictable way of assessing a level of risk for a given subject person using a social network in order to assist decision makers, assessors, and even the subject person to more easily understand immediately the level of risk that the subject person may be exposed to. Using the embodiments described herein affords a scoring system that can provide a concise and predictable way of assessing the level of risk that helps to eliminate the need to parse and aggregate the data manually.

Figure 14:
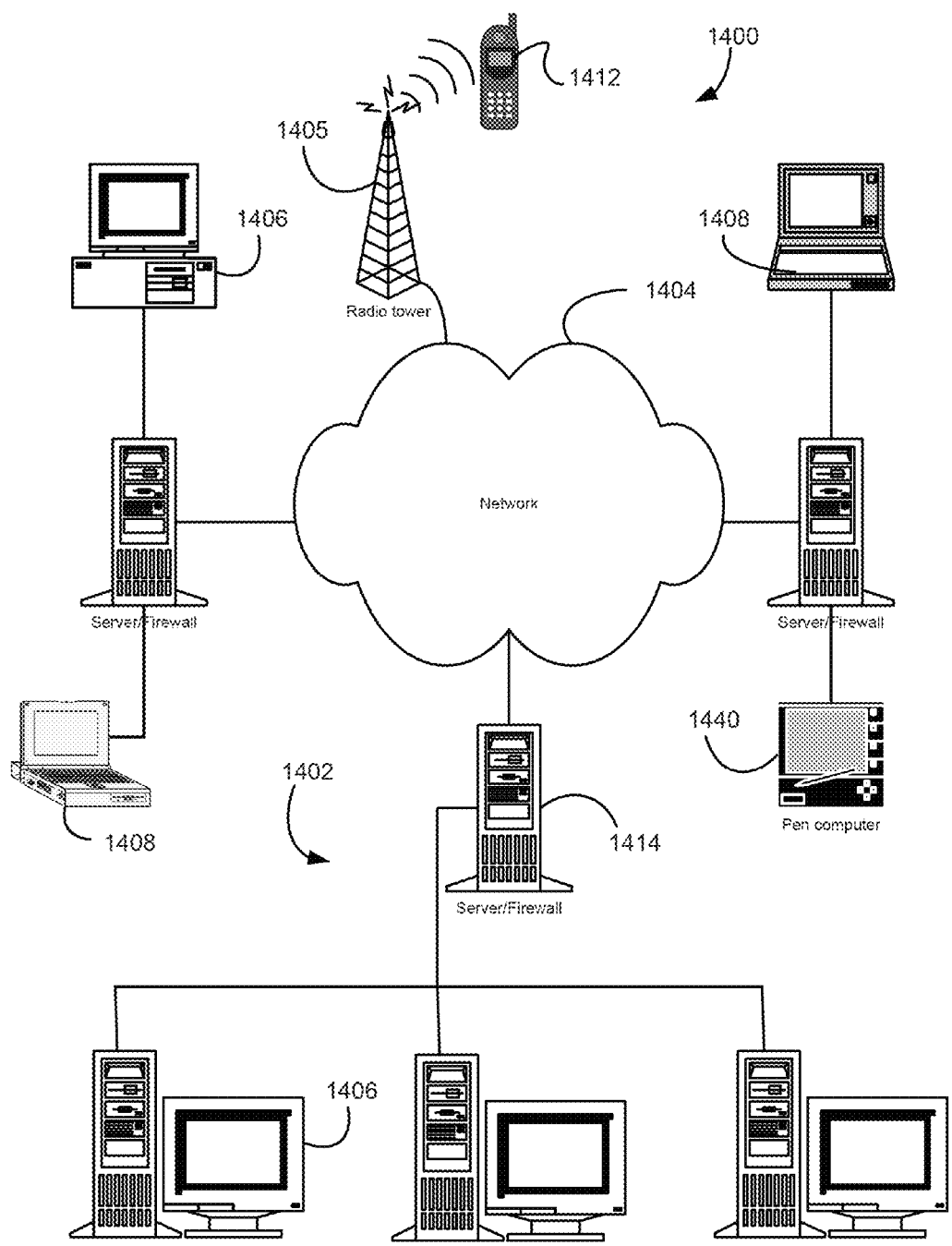
FIG. 14 is a schematic diagram of an illustrative network system in accordance with an exemplary embodiment.

Various embodiments may also be implemented to calculate a credit worthiness score. In such an embodiment, the overall risk score calculated from the subject person's social interaction may be used to derive a credit score for that person. The subject person's social graph can be analyzed to assess this score. For example, if the subject person is friends with Warren Buffet, for instance, the subject person may likely have a higher credit score. The credit score calculated in this fashion may be used across geographies since a social graph may be considered universal. Another embodiment may be implemented to assess job applicants or job applications. In such an embodiment, an overall risk score of the applicant may be used to determine the quality and/or reliability of the job applicant. Other embodiments may be implemented by a social network to monitor activity and users of the social network FIG. 14 illustrates an exemplary network system 1400 with a plurality of components 1402 that may be used when implementing various embodiments described herein. As shown, such components include a network 1404 which take any form including, but not limited to a local area network, a wide area network such as the Internet, and a wireless network 1405. Coupled to the network 1404 is a plurality of computers which may take the form of desktop computers 1406, laptop or notebook computers 1408, hand-held computers 1410 (including wireless devices 1412 such as wireless PDA's, e-readers, tablet computers and/or mobile phones/smart phones), or any other type of computing hardware/software. As an option, the various computers may be connected to the network 1404 by way of one or more servers (and/or network switch(es)/router(s)) 1414 which may be equipped with a firewall for security purposes. It should be noted that any other type of hardware or software may be included in the system and be considered a component thereof.

Figure 15:
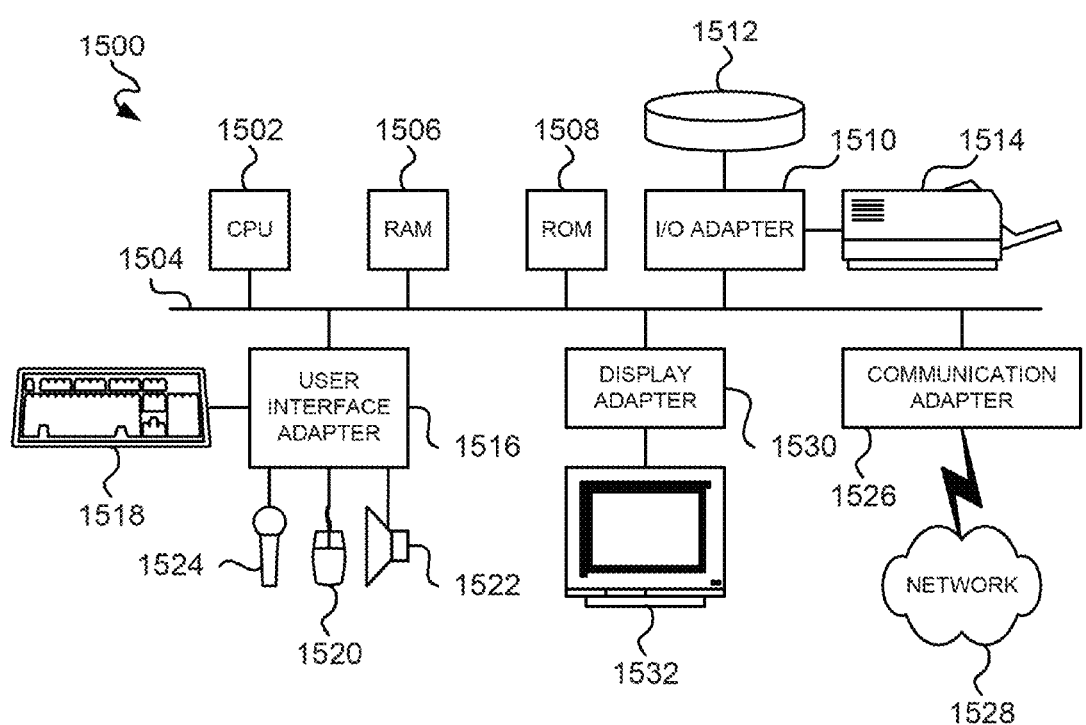
FIG. 15 is a schematic diagram of a representative hardware environment in accordance with one embodiment.

A representative hardware environment associated with the various components of FIG. 14 is depicted in FIG. 15. In the present description, the various sub-components of each of the components may also be considered components of the system. For example, particular software modules executed on any component of the system may also be considered components of the system. In particular, FIG. 15 illustrates an exemplary hardware configuration of a computer 1500 having a central processing unit 1502, such as a microprocessor, and a number of other units interconnected via a system bus 1504. The illustrative computer 1500 shown in FIG. 15 may also include a Random Access Memory (RAM) 1506, Read Only Memory (ROM) 1508, an I/O adapter 1510 for connecting peripheral devices such as, for example, disk storage units 1512 and printers 1514 to the bus 1504, a user interface adapter 1516 for connecting various user interface devices such as, for example, a keyboard 1518, a mouse 1520, a speaker 1522, a microphone 1524, and/or other user interface devices such as a touch screen or a digital camera to the bus 1504, a communication adapter 1526 for connecting the computer 1500 to a communication network 1528 (e.g., a data processing network, wireless network, etc.) and a display adapter 1530 for connecting the bus 1504 to a display device 1532. The computer may utilize an operating system such as, for example, a Microsoft Windows operating system (O/S), an Apple O/S, a Linux O/S and/or a UNIX O/S. Those of ordinary skill in the art will appreciate that embodiments may also be implemented on platforms and operating systems other than those mentioned. One of ordinary skilled in the art will also be able to combine software with appropriate general purpose or special purpose computer hardware to create a computer system or computer sub-system for implementing various embodiments described herein. It should be understood the use of the term logic may be defined as hardware and/or software components capable of performing/executing sequence(s) of functions. Thus, logic may comprise computer hardware, circuitry (or circuit elements) and/or software or any combination thereof.

Embodiments of the present invention may also be implemented using computer program languages such as, for example, ActiveX, Java, C, and the C++ language and utilize object oriented programming methodology. Any such resulting program, having computer-readable code, may be embodied or provided within one or more computer-readable media, thereby making a computer program product (i.e., an article of manufacture). The computer readable media may be, for instance, a fixed (hard) drive, diskette, optical disk, magnetic tape, semiconductor memory such as read-only memory (ROM), etc., The article of manufacture containing the computer code may be made and/or used by executing the code directly from one medium, by copying the code from one medium to another medium, or by transmitting the code over a network.

Various systems, methods, and computer program products on a computer readable storage medium for causing a computer to perform a method may be implemented in accordance with the various embodiments described herein. For example, a server may be provided that has a component coupled to a network to permit the receiving, via the network, of one or more messages containing information describing one or more aspects of a malware detected on a remote computer by an antivirus program.

While various embodiments have been described, they have been presented by way of example only, and not limitation. Thus, the breadth and scope of any embodiment should not be limited by any of the above described exemplary embodiments, but should be defined only in accordance with the following claims and their equivalents.

What is claimed:

1. A method, comprising:
   accessing a plurality of social networks via a network;
   obtaining information associated with a user's account from each of the social networks, the information from each social network comprising personal information about the user and social graph information about the user and friends of the user;
   comparing the personal information obtained from the plurality of social networks to determine a normalized set of personal information for the user;
   comparing the social graphs obtained from the plurality of social networks to determine a normalized set of friends associated with the user; and
   storing the normalized set of personal information and friends associated with the user in a data store;
   wherein each social graph comprises a plurality of nodes, the nodes including a user node and a plurality of friend nodes; and
   wherein comparing the social graphs includes: determining a degree of matching between similar friend nodes of the plurality of social graphs; identifying a set of maximum common subgraphs shared between the plurality of social graphs; for each pair of shared friend nodes in the set of maximum common subgraphs, adding a friend to a set of normalized friends associated with the user.

2. The method of claim 1, wherein comparing the social graphs includes matching nodes common to the social graphs.

3. The method of claim 1, wherein a friend is added for the set of normalized friends for each unshared node found in the social graphs.

4. The method of claim 1, wherein comparing the personal information includes calculating a Levenshtein distance for each similar item of personal information.

5. The method of claim 1, wherein comparing the social graphs includes calculating a Levenshtein distance for each pair of similar nodes in the plurality of social graphs.

6. A system, comprising:
   an interface adapted to access a plurality of social networks via a network;
   a social network adapter adapted to obtain information associated with a user's account from each of the social networks, the information from each social network comprising personal information about the user and social graph information about the user and friends of the user;
   a data analyzer adapted to compare the personal information obtained from the plurality of social networks to determine a normalized set of personal information for the user;
   compare the social graphs obtained from the plurality of social networks to determine a normalized set of friends associated with the user; and
   a data store adapted to store the normalized set of personal information and friends associated with the user;
   wherein each social graph comprises a plurality of nodes, the nodes including a user node and a plurality of friend nodes; and
   wherein comparing the social graphs includes: determining a degree of matching between similar friend nodes of the plurality of social graphs; identifying a set of maximum common subgraphs shared between the plurality of social graphs; for each pair of shared friend nodes in the set of maximum common subgraphs, adding a friend to a set of normalized friends associated with the user.

7. The system of claim 6, wherein the system matches nodes common to the social graphs to determine a normalized set of friends associated with the user.

8. The system of claim 6, wherein a friend is added for the set of normalized friends for each unshared node found in the social graphs.

9. The system of claim 6, wherein comparing the personal information includes calculating a Levenshtein distance for each similar item of personal information.

10. The method of claim 6, wherein comparing the social graphs includes calculating a Levenshtein distance for each pair of similar nodes in the plurality of social graphs.

* * * * *